US008909541B2

(12) United States Patent
Fairfax et al.

(10) Patent No.: US 8,909,541 B2
(45) Date of Patent: *Dec. 9, 2014

(54) SYSTEM AND METHOD FOR MANIPULATING SUCCESS DETERMINATES IN SOFTWARE DEVELOPMENT COMPETITIONS

(75) Inventors: Ryan J. Fairfax, Redmond, WA (US);
Javier Fernandez-Ivern, Cincinnati, OH (US); John M. Hughes, Hebron, CT (US); Michael Lydon, Hebron, CT (US); David Messinger, West Hartford, CT (US)

(73) Assignee: Appirio, Inc., San Francisco, CA (US)

( * ) Notice: Subject to any disclaimer, the term of this patent is extended or adjusted under 35 U.S.C. 154(b) by 522 days.

This patent is subject to a terminal disclaimer.

(21) Appl. No.: 12/465,369

(22) Filed: May 13, 2009

(65) Prior Publication Data
US 2010/0178978 A1    Jul. 15, 2010

Related U.S. Application Data

(60) Provisional application No. 61/020,703, filed on Jan. 11, 2008.

(30) Foreign Application Priority Data

Jan. 9, 2009    (WO) ................ PCT/US2009/030593

(51) Int. Cl.
*G06Q 10/00*    (2012.01)
*G06Q 10/06*    (2012.01)
*G06Q 10/10*    (2012.01)

(52) U.S. Cl.
CPC .... *G06Q 10/06375* (2013.01); *G06Q 10/06315* (2013.01); *G06Q 10/10* (2013.01); *G06Q 10/06398* (2013.01); *G06Q 10/101* (2013.01)
USPC ......... 705/7.37; 705/7.42; 705/7.25; 705/300

(58) Field of Classification Search
CPC .................. G06Q 10/06375; G06Q 10/06398; G06Q 10/06315; G06Q 10/101
USPC ............ 705/7.37, 7.42, 7.25, 300; 463/23, 25
See application file for complete search history.

(56) References Cited

U.S. PATENT DOCUMENTS

| 4,525,599 | A | 6/1985 | Curran et al. |
| 5,195,033 | A | 3/1993 | Samph et al. |

(Continued)

FOREIGN PATENT DOCUMENTS

| WO | WO-97/39811 | 10/1997 |
| WO | WO-2005/048109 | 5/2005 |

OTHER PUBLICATIONS

2006 TopCoder Open—Computer Programming Tournament—Componenet competition rules and regulations, Topcoder, Archives-org webpages, Nov. 10, 2006 http://web.archive.org/web/20061110143026/http://www.topcoder.com/tc?module=Static &d1=tournaments&d2=tco06&d3=comp_rules.*

(Continued)

*Primary Examiner* — Justin M Pats
*Assistant Examiner* — Octavian Rotaru
(74) *Attorney, Agent, or Firm* — Goodwin Procter LLP

(57) ABSTRACT

In general, in one aspect, a method for developing an asset by competition includes specifying standards for an asset, receiving from potential contestants indicia of interest in participating in an asset development competition in which the contestants compete to develop an asset, and determining an estimated likelihood that the asset development competition will result in an asset that meets the minimum standards based on historical information about the performance of the contestants from whom the indicia of interest were received. Steps may be taken to increase the estimated likelihood of success, upon a determination that the likelihood is less than desired. Steps may be taken to prevent registration by additional participants, upon a determination that the estimated likelihood is at or above a predetermined threshold.

15 Claims, 13 Drawing Sheets

(56) References Cited

U.S. PATENT DOCUMENTS

| | | | |
|---|---|---|---|
| 5,361,360 A | 11/1994 | Ishigami et al. | |
| 5,513,994 A | 5/1996 | Kershaw et al. | |
| 5,779,549 A | 7/1998 | Walker et al. | |
| 5,794,207 A | 8/1998 | Walker et al. | |
| 5,799,320 A | 8/1998 | Klug | |
| 5,823,879 A | 10/1998 | Goldberg et al. | |
| 5,826,878 A * | 10/1998 | Kiyosaki et al. | 273/256 |
| 5,827,070 A | 10/1998 | Kershaw et al. | |
| 5,835,896 A | 11/1998 | Fisher et al. | |
| 5,862,223 A | 1/1999 | Walker et al. | |
| 5,916,024 A | 6/1999 | Von Kohorn | |
| 5,933,811 A | 8/1999 | Angles et al. | |
| 5,947,747 A | 9/1999 | Walker et al. | |
| 5,963,916 A | 10/1999 | Kaplan | |
| 5,970,475 A | 10/1999 | Barnes et al. | |
| 5,987,302 A | 11/1999 | Driscoll et al. | |
| 5,995,951 A | 11/1999 | Ferguson | |
| 6,010,403 A | 1/2000 | Adam et al. | |
| 6,012,984 A | 1/2000 | Roseman | |
| 6,024,641 A * | 2/2000 | Sarno | 463/17 |
| 6,055,511 A | 4/2000 | Luebbering et al. | |
| 6,088,679 A | 7/2000 | Barkley | |
| 6,112,049 A | 8/2000 | Sonnenfeld | |
| 6,163,805 A | 12/2000 | Silva et al. | |
| 6,174,237 B1 * | 1/2001 | Stephenson | 463/42 |
| 6,193,610 B1 | 2/2001 | Junkin | |
| 6,224,486 B1 | 5/2001 | Walker et al. | |
| 6,264,560 B1 | 7/2001 | Goldberg et al. | |
| 6,293,865 B1 | 9/2001 | Kelly et al. | |
| 6,301,574 B1 | 10/2001 | Thomas et al. | |
| 6,341,212 B1 | 1/2002 | Shende et al. | |
| 6,345,239 B1 | 2/2002 | Bowman-Amuah | |
| 6,356,909 B1 | 3/2002 | Spencer | |
| 6,397,197 B1 | 5/2002 | Gindlesperger | |
| 6,408,283 B1 | 6/2002 | Alaia et al. | |
| 6,427,132 B1 | 7/2002 | Bowman-Amuah | |
| 6,431,875 B1 | 8/2002 | Elliott et al. | |
| 6,434,738 B1 | 8/2002 | Arnow | |
| 6,453,038 B1 | 9/2002 | McFarlane et al. | |
| 6,513,042 B1 | 1/2003 | Anderson et al. | |
| 6,532,448 B1 | 3/2003 | Higginson et al. | |
| 6,569,012 B2 | 5/2003 | Lydon et al. | |
| 6,578,008 B1 | 6/2003 | Chacker | |
| 6,604,997 B2 | 8/2003 | Saidakovsky et al. | |
| 6,606,615 B1 | 8/2003 | Jennings et al. | |
| 6,631,404 B1 | 10/2003 | Philyaw | |
| 6,636,892 B1 | 10/2003 | Philyaw | |
| 6,658,642 B1 | 12/2003 | Megiddo et al. | |
| 6,659,861 B1 | 12/2003 | Faris et al. | |
| 6,662,194 B1 | 12/2003 | Joao | |
| 6,718,535 B1 | 4/2004 | Underwood | |
| 6,761,631 B2 | 7/2004 | Lydon et al. | |
| 6,791,588 B1 | 9/2004 | Philyaw | |
| 6,824,462 B2 | 11/2004 | Lydon et al. | |
| 6,859,523 B1 | 2/2005 | Jilk et al. | |
| 6,895,382 B1 | 5/2005 | Srinivasan et al. | |
| 6,910,631 B2 | 6/2005 | Knowles et al. | |
| 6,915,266 B1 | 7/2005 | Saeed et al. | |
| 6,938,048 B1 | 8/2005 | Jilk et al. | |
| 6,952,678 B2 | 10/2005 | Williams et al. | |
| 6,963,850 B1 | 11/2005 | Bezos et al. | |
| 6,964,608 B1 * | 11/2005 | Koza | 463/9 |
| 6,970,677 B2 | 11/2005 | Jongsma et al. | |
| 6,984,177 B2 | 1/2006 | Lydon et al. | |
| 6,993,496 B2 | 1/2006 | Pittelli | |
| 7,027,997 B1 | 4/2006 | Robinson et al. | |
| 7,050,868 B1 * | 5/2006 | Graepel et al. | 700/93 |
| 7,054,464 B2 | 5/2006 | Poor | |
| 7,082,474 B1 | 7/2006 | Hubbard | |
| 7,131,071 B2 | 10/2006 | Gune et al. | |
| 7,139,999 B2 | 11/2006 | Bowman-Amuah | |
| 7,155,400 B1 | 12/2006 | Jilk et al. | |
| 7,162,198 B2 | 1/2007 | Kuntz et al. | |
| 7,162,433 B1 | 1/2007 | Foroutan | |
| 7,207,568 B2 | 4/2007 | France et al. | |
| 7,234,131 B1 | 6/2007 | Speyrer et al. | |
| H002201 H | 9/2007 | Stytz et al. | |
| 7,292,990 B2 | 11/2007 | Hughes | |
| 7,300,346 B2 | 11/2007 | Lydon et al. | |
| 7,311,595 B2 | 12/2007 | Lydon et al. | |
| 7,331,034 B2 | 2/2008 | Anderson | |
| 7,366,680 B1 * | 4/2008 | Creel et al. | 705/7.17 |
| 7,386,831 B2 | 6/2008 | Flanagan | |
| 7,392,285 B2 | 6/2008 | Philyaw | |
| 7,401,031 B2 | 7/2008 | Hughes | |
| 7,412,666 B2 | 8/2008 | Philyaw | |
| 7,416,488 B2 | 8/2008 | Peterson et al. | |
| 7,722,461 B2 * | 5/2010 | Gatto et al. | 463/25 |
| 7,870,535 B2 | 1/2011 | Rippert, Jr. et al. | |
| 8,021,221 B2 * | 9/2011 | Lydon et al. | 463/9 |
| 8,175,726 B2 * | 5/2012 | Herbrich et al. | 700/91 |
| 8,231,453 B2 * | 7/2012 | Wolf et al. | 463/20 |
| 8,538,910 B2 * | 9/2013 | Minka et al. | 706/61 |
| 8,583,266 B2 * | 11/2013 | Herbrich et al. | 700/93 |
| 2001/0032170 A1 | 10/2001 | Sheth | |
| 2001/0032189 A1 | 10/2001 | Powell | |
| 2001/0034631 A1 | 10/2001 | Kiselik | |
| 2001/0037281 A1 | 11/2001 | French et al. | |
| 2001/0039529 A1 | 11/2001 | Hoffman | |
| 2001/0049615 A1 | 12/2001 | Wong et al. | |
| 2001/0049648 A1 | 12/2001 | Naylor et al. | |
| 2002/0019844 A1 | 2/2002 | Kurowski et al. | |
| 2002/0026321 A1 | 2/2002 | Faris et al. | |
| 2002/0035450 A1 | 3/2002 | Thackston | |
| 2002/0038221 A1 | 3/2002 | Tiwary et al. | |
| 2002/0046091 A1 | 4/2002 | Mooers et al. | |
| 2002/0069076 A1 | 6/2002 | Faris et al. | |
| 2002/0077902 A1 | 6/2002 | Marcus | |
| 2002/0077963 A1 | 6/2002 | Fujino et al. | |
| 2002/0107972 A1 | 8/2002 | Keane | |
| 2002/0116266 A1 | 8/2002 | Marshall | |
| 2002/0120501 A1 | 8/2002 | Bell et al. | |
| 2002/0120553 A1 | 8/2002 | Bowman-Amuah | |
| 2002/0124048 A1 | 9/2002 | Zhou | |
| 2002/0132656 A1 * | 9/2002 | Lydon et al. | 463/9 |
| 2002/0156668 A1 | 10/2002 | Morrow et al. | |
| 2002/0161696 A1 * | 10/2002 | Gebert | 705/37 |
| 2003/0009740 A1 | 1/2003 | Lan | |
| 2003/0018559 A1 | 1/2003 | Chung et al. | |
| 2003/0046681 A1 | 3/2003 | Barturen et al. | |
| 2003/0060910 A1 | 3/2003 | Williams et al. | |
| 2003/0115570 A1 | 6/2003 | Bisceglia | |
| 2003/0130021 A1 * | 7/2003 | Lydon et al. | 463/9 |
| 2003/0153386 A1 * | 8/2003 | Lydon et al. | 463/40 |
| 2003/0192029 A1 | 10/2003 | Hughes | |
| 2003/0233278 A1 | 12/2003 | Marshall | |
| 2004/0167796 A1 | 8/2004 | Lynch et al. | |
| 2004/0210550 A1 | 10/2004 | Williams et al. | |
| 2005/0027582 A1 | 2/2005 | Chereau et al. | |
| 2005/0114829 A1 | 5/2005 | Robin et al. | |
| 2005/0160395 A1 | 7/2005 | Hughes | |
| 2005/0223318 A1 | 10/2005 | Diesel et al. | |
| 2006/0052886 A1 | 3/2006 | Lydon et al. | |
| 2006/0080156 A1 | 4/2006 | Baughn et al. | |
| 2006/0161888 A1 | 7/2006 | Lovisa et al. | |
| 2006/0184384 A1 | 8/2006 | Chung et al. | |
| 2006/0184928 A1 | 8/2006 | Hughes | |
| 2006/0229929 A1 * | 10/2006 | Hughes | 705/9 |
| 2006/0248504 A1 | 11/2006 | Hughes | |
| 2006/0252479 A1 * | 11/2006 | Lydon et al. | 463/9 |
| 2007/0112706 A1 * | 5/2007 | Herbrich et al. | 706/21 |
| 2007/0146360 A1 | 6/2007 | Clatworthy et al. | |
| 2007/0180416 A1 | 8/2007 | Hughes | |
| 2007/0186230 A1 | 8/2007 | Foroutan | |
| 2007/0220479 A1 | 9/2007 | Hughes | |
| 2007/0226062 A1 * | 9/2007 | Hughes et al. | 705/14 |
| 2007/0244744 A1 * | 10/2007 | Spatz et al. | 705/12 |
| 2007/0244749 A1 | 10/2007 | Speiser et al. | |
| 2007/0250378 A1 * | 10/2007 | Hughes et al. | 705/11 |
| 2007/0281771 A1 * | 12/2007 | Lydon et al. | 463/9 |
| 2007/0288107 A1 | 12/2007 | Fernandez-Ivern et al. | |
| 2008/0027783 A1 | 1/2008 | Hughes et al. | |
| 2008/0052146 A1 | 2/2008 | Messinger et al. | |
| 2008/0167960 A1 | 7/2008 | Hughes | |

(56) References Cited

U.S. PATENT DOCUMENTS

| | | | |
|---|---|---|---|
| 2008/0196000 A1 | 8/2008 | Fernandez-Ivern et al. | |
| 2008/0228681 A1 | 9/2008 | Hughes | |
| 2008/0281610 A1 | 11/2008 | Yoshida et al. | |
| 2008/0281616 A1 | 11/2008 | Johnson | |
| 2008/0320436 A1 | 12/2008 | Hughes | |
| 2009/0007074 A1 | 1/2009 | Campion et al. | |
| 2009/0024457 A1 | 1/2009 | Foroutan | |
| 2009/0104957 A1* | 4/2009 | Lydon et al. | 463/9 |
| 2009/0203413 A1* | 8/2009 | Jefts et al. | 463/9 |
| 2010/0178978 A1* | 7/2010 | Fairfax et al. | 463/25 |

OTHER PUBLICATIONS

2006 TopCoder Open—Computer Programming Tournament—Date extension, Jan. 2, 2007 http://web.archive.org/web/20070102225000/http://studio.topcoder/?module=ViewContestDetails&ct=2050.*

2006 TopCoder Open—Computer Programming Tournament—Alghorithm competition rules and regulations, Topcoder, Archives-org webpages, Nov. 10, 2006 http://web.archive.org/web/20061110143052/http://topcoder.com/tc?module=Static&d1=tournaments&d2=tco06&d3=alg_rules.*

LogicLibrary teams with TopCoder for Service oriented arhitecture deployment solutions, Wireless News, p. 1, Mar. 18, 2005.*

Logidex asset center becomes first public site to demonstrate live, searchable topcoder components, announces availability of TopCoder Reference Model and Assets, Business Wire, NY, 2005.*

Dr Yount Rick, The Normal Curve and Hypothesis Testing, Chapter 17, 4th edition 2006 http://www.napce.org/documents/research-design-yount/17_normal_4th.pdf.*

2006 TopCoder Open—Computer Programming Tournament—Alghorithm competition rules and regulations, Topcoder, Archives-org webpages, Nov. 10, 2006.*

2006 TopCoder Open—Computer Programming Tournament—Component competition rules and regulations, Topcoder, Archives-org webpages, Nov. 10, 2006.*

2006 TopCoder Open—Computer Programming Tournament—date extension, Jan. 2, 2007.*

Glickman, Mark E, Parameter estimation in large dynamic paired comparison experiments, Appl Statist, 48, Part 3, pp. 377-394, 1999 http://math.bu.edu/people/mg/research/glicko.pdf.*

Glickman Mark F, The Glicko-2 System for Rating Players in Head-to-Head Competitions, Boston University 2000.* de Blecourt Sandra, The Legacy of Arpad Elo, The Development of Chess-Rating System, Universiteit van Amsterdam, Dec. 1, 1998.* van Wegberg et al, Competing communities of users and developers of computer software, citeseerx May 2000 http://citeseerx.ist.psu.edu/viewdoc/summary?doi=10.1.1.36.3289.*

"/n software inc.—General Corporate Information" [online], [Retrieved on Jul. 28, 2006]. Retrieved from the Internet: http://www.nsoftware.com/company/corporateinfo.aspx.

"About CBDi" [online], [Retrieved on Jul. 28, 2006]. Retrieved from the Internet: http://www.cbdiforum.com/public/about.php3.

"About ComponentOne" [online], [Retrieved on Jul. 28, 2006]. Retrieved from the Internet: <http://www.componentone.com/Company.aspx?ItemType=1&TabTypeID=3&TabmapID=149&ItemID=0&SubCategoryTypeID=0&PanelIndex=2&TabID=176>.

"ACM/IBM Quest for Java 2000" [online], [Retrieved on Jul. 25, 2006]. Retrieved from the Internet: http://www.acm.org/jquest/.

"Brainbench the measure of achievement" [online], [Retrieved on Nov. 9, 2000]. Retrieved from the Internet: <http://www.brainbench.com/xml/bb/homepage.xml>.

"CollabNet Corporate Background" [online], [Retrieved on Jul. 28, 2006]. Retrieved from the Internet: http://www.collab.net/media/pdfs/collabnet_background.pdf.

"ComponentSource: About Us" [online], [Retrieved on Jul. 28, 2006]. Retrieved from the Internet: http://www.componentsource.com/services/aboutcomponentsource.asp.

"Ed's Programming Contest Problem Archive" [online], [Retrieved on Jul. 25, 2006]. Retrieved from the Internet: http://www.karrels.org/Ed/ACM/index.html.

"Flashline 4 Provides Software Asset Management for Enterprise Programs" [online], [Retrieved on Jul. 28, 2006]. Retrieved from the Internet: http://www.flashline.com/fcm/fcm/jsp.

"Hack the Web for Fun!" [online], [Retrieved on Jul. 26, 2006]. Retrieved from the Internet: <http://web.archive.org/web/20000816205559/http://java.sun.com/contest/external.html>.

"l0l Software Team" [online], [Retrieved on Jul. 24, 2006 ]. Retrieved from the Internet: http://olympiads.win.tue.nl/ioi/st/.

"IBM Patents Method for Paying Open Source Volunteers" posted at <http://www.theinquirer,net/Default.aspx?article--13813> Retrieved from the Internet on Jan. 29, 2004.

"ILOG Corportae Profile" [online], [Retrieved on Jul. 28, 2006]. Retrieved from the Internet: http://www.ilog.com/corporate/profile/.

"JavaWorld Code Masters" [online], [Retrieved on Jul. 25, 2006]. Retrieved from the Internet: http://infoart.udm.ru/it/news/src/20000052.htm.

"LogicLibrary Company Overview" [online], [Retrieved on Jul. 28, 2006]. Retrieved from the Internet: http://www.logiclibrary.com/about_us/company_profile.php.

"Problem Set Archive with Online Judge" [online], [Retrieved on Jul. 26, 2006]. Retrieved from the Internet: http://acm.uva.es/problemset/.

"Programmer of the Month Problem" [online], dated Dec. 31, 1995, [Retrieved on Jul. 19, 2011]. Retrieved from the Internet: http://potm.tripod.com/KNIGHTCRAWLER/problem.long.html.

"Rogue Wave Corporate Information" [online], [Retrieved on Jul. 28, 2006]. Retrieved from the Internet: http://www.roguewave.com/corp/.

"The Dutch Olympiad in Informatics" Powerpoint presentation slides printout.

"URCSC Computer Programming Contest" [online], <http://www.mathcs.richmond.edu/~urcsc/contest/rules2.html>, Retrieved from the Internet on Jul. 25, 2006.

"What is SourceForge.net" [online], [Retrieved on Jul. 28, 2006]. Retrieved from the Internet: http://sourceforge.net/docman/display_doc.php?docid=6025&group_id=1.

1999 ICFP Programming Contest, [online] 1999, [retrieved on Jul. 28, 2006]. Retrieved from the internet: URL: <http://www.cs.virginia.edu/~jks6b/ocfp/>.

An Overview of PC2s [online], [Retrieved on Jul. 24, 2006]. Retrieved from the Internet: <http://hera.ecs.csus.edu/pc2/pc2desc.html,> Revised Oct. 18, 2002.

Annavajjala, "JAVA Challenge Software Project" Master's Thesis submitted to the Department of Computer Science and Electrical Engineering at West Virginia University.

AssessNet Features and Benefits http://web.archive.org/web/20001018210736/www.assessnet.com/features.htm. Retrieved on Oct. 21, 2008 (2 pages).

Astrachan, O. "The Internet Programming Contest: A Report and Philosophy" Association for Computing Machinery, Feb. 1993; Retrieved from the Internet on Jul. 25, 2006 <http://www.cs.dartmouth.edu/~dfk/papers/astrachan:contest.pdf>.

Bennett, Lynda et al. "Forging an Outsourcing Partnership that Works" IPCC 94, pp. 406-410, 1994.

Blecourt, "The Legacy of Arpad Elo: The Development of a Chess Rating System" University of Amsterdam, Dec. 1, 1998.

Boersen, Raewyn et al. "Programming Contests: Two Innovative Models from New Zealand", text and description.

Brainbench Standard Assessments: http://www.brainbench.com/xml/bb/business/productsservices/products/assessments/standardassessm, Retrieved on Mar. 10, 2004 (1 page).

Carlton, Jim. Strutting their data, geeks go to battle for bucks and glory. Wall Street Journal, Mar. 11, 1994, col. 4, pA1(W) & pA1(e), ISSN 0193-241.

Cormack, Gord et al. "Structure, Scoring and Purpose of Computing Competition (Part 2)" Powerpoint presentation slides printout, 25 pages.

Cormack, Gordon, "Statistical Analysis of IOI Scoring" Brief description.

Cormack, Gordon "Random Factors in IOI Test Case Selection" text and description, University of Waterloo, Ontario, Canada.

(56) References Cited

OTHER PUBLICATIONS

Cormack, Gordon "Statistical Analysis of IOI Scoring" Powerpoint presentation slides printout, Jan. 24, 2006.
Cormack, Gordon et al. "Structure, Scoring and Purpose of Computing Competition" Powerpoint presentation slides printout, 10 pages.
Cormack, Gordon et al. "Structure, Scoring and Purpose of Computing Competition", text and description, University of Waterloo.
Cooper, Jack et al. "Software Acquisition Capability Maturity Model (SA-CMM_Version 1.03)", Mar. 2002, CMU, Whole Manual.
Dagiene, Valentina "Competition in Information Technology—learning in an attractive way", text and description, pp. 1-7.
Dhillon, Gurprett Outsourcing of IT service Provision Issues, Concerns and Some Case Examples, 20 pages, Fall 2002.
Final Office Action for US Patent No. 6,569,012 dated Dec. 6, 2002.
Fink, William & Joyce Dick. Computer Programming Tournament as a learning Experience. The Computer Education Quarterly. Summer 1989, vol. 11, Issue 2 pp. 46-52.
Fisher, Maryanne et al. "Gender and Programming Contests: Mitigating Exclusionary Practices" text and description.
Fisher, Maryanne et al. "Gender and Programming Contests: Mitigating Exclusionary Practices" Powerpoint presentation slides printout.
Flipcode. Coding contest [online]. 2000 [retrieved on Jul. 26, 2009]. Retrieved from the Internet: <http://www.flipcode.com/cgi-bin/fcarticles.cgi?show=62761>.
Forisek, Michal "On suitability of programming competition tasks for automated testing" Powerpoint presentation slides printout, 14 pages.
Forisek, Michal "On suitability of programming competition tasks for automated testing" text and description, pp. 12 pages.
Forsberg et al., "Managing Outsourcing of Software Development" 48 pages, Spring 2001.
Glickman, Mark E., The Glicko-2 system for Rating Players in Head-to-Head Competition, Jul. 2000, Retrieved from the Internet on Oct. 23, 2003 at http://math.bu.edu/people/mg/ratings/glicko2desc.pdf.
Google Programming Contest, First Annual Google Programming Contest, http://web.archive.org/web/20020207103456/http://www.google.com/programming-contest/index.html Retreived from the internet Mar. 5, 2009, 4 pages.
<http://www.programmingbids.com/>, informational webpages retrieved from the Internet Nov. 29, 2001, 15 pages.
ICFP Functional Programming Contest, [online] 1998, [retrieved on Jul. 26, 2006]. Retrieved from the internet: URL http://www.ai.mit.edu/extra/icfp-contest.
ICFP Programming Contest Home Page—The Third Annual ICFP Programming Contest, Retrieved from the Internet Mar. 5, 2009: http://web.archive.org/web/20000816191608/http://www.cs.cornell.edu/icfp.
International Preliminary Examination Report for PCT/US02/00394 dated Mar. 19, 2003 (7 pages).
International Preliminary Report on Patentability for PCT/US05/001483 dated Dec. 4, 2006 (10 pages).
International Preliminary Report on Patentability for PCT/US07/01535 dated Dec. 16, 2008 (5 pages).
International Preliminary Report on Patentability for PCT/US07/06178 dated Jan. 13, 2009 (5 pages).
International Preliminary Report on Patentability for PCT/US07/009477 dated Dec. 16, 2008 (6 pages).
International Preliminary Report on Patentability for PCT/US07/010414 dated Dec. 16, 2008 (5 pages).
International Preliminary Report on Patentability for PCT/US07/12792 dated Dec. 16, 2008 (5 pages).
International Search Report for PCT/US02/00394 dated Jul. 23, 2002 (6 pages).
International Search Report for PCT/US03/10537 dated Jul. 17, 2003 (2 pages).
International Search Report for PCT/US05/001483 dated Oct. 18, 2006 (4 pages).
International Search Report for PCT/US07/01535 dated Nov. 26, 2002 (2 pages).
International Search Report for PCT/US07/06178 dated Dec. 5, 2008 (2 pages).
International Search Report for PCT/US07/009477 dated Nov. 21, 2008 (3 pages).
International Search Report for PCT/US07/10414 dated Nov. 10, 2008 (2 pages).
International Search Report for PCT/US07/12792 dated Nov. 10, 2008 (3 pages).
International Search Report for PCT/US08/068101 dated Feb. 19, 2009 (4 pages).
Jones, Albyn, International Soccer Ranks and Ratings, Statistics in Sports, vol. 2, Issue 1, Spring 2000 [retrieved on Jun. 16, 2003].
Kirsner, Scott, "The New Rules", <http://www.topcoder.com/index?t=news_events&c=article_bglobe>, downloaded from the Internet Jun. 21, 2006, 4 pages.
Lewis, "Tournaments become latest high-tech recruiting tool," The Boston Globe at C1, May 6, 2002.; <http://www.cs.berkeley.edu/~hilfingr/programming-contest/acm-news-05-10-2002.txt>—*Replacement text, retrieved from the Internet on Jul. 25, 2006.
U.S. Chess Federation [online], [Retrieved on Dec. 3, 2002]. Retrieved from the Internet: http://www.uschess.org/about/about/html.
Manzoor, Shahriar "Analyzing Programming Contest Statistics" (<http://online-judge.uva.es/p>) Southeast University, Dhaka, Bangladesh.
Manzoor, Shahriar "Analyzing Programming Contest Statistics" (<http://online-judge.uva.es/contest/>) Southeast University, Dhaka, Bangladesh.
Michalski, Marcin et al. "Plug & Play Contest System" (SIO.net), Basic guidelines sheet, Institute of Informatics, Warsaw University, Poland.
Michalski, Marcin et al. "Plug & Play Contest System" (SIO.net), text and description, Institute of Informatics, Warsaw University, Poland.
National Ratings System, Sep. 1993 [retrieved] on Jun. 16, 2003, Retrieved from the Internet <http://members.ozemail.com.au/aspansw/nrs.html.
Nebraska Wins Collegiate Computer Programming Regional to Qualify for World Finals, Scarlet, Nov. 20, 1998 [retrieved on Jun. 16, 2003 from the Internet: http://www.unl.edu/scarlet/v8n34/v8n34features.html.
Office Action for US Patent No. 6,569,012 dated Aug. 21, 2002.
Office Action for US Patent No. 6,569,012 dated Jun. 27, 2002.
Office Action for U.S. Appl. No. 10/377,343 dated Jul. 25, 2003.
Office Action for U.S. Appl. No. 10/377,344 dated Jul. 25, 2003.
Opmanis, Martins "Possible ways to improve Olympiads in Informatics" Powerpoint presentation slides printout.
Opmanis, Martins "Possible ways to improve Olympiads in Informatics" text and description, Institute of Mathematics and Computer Science, University of Latvia, pp. 1-11.
O'Sullivan, Kate. "Best of the Web: Testing Recruits, Net-Style" Dec. 2000, pp. 1-5 <http://pf.inc.com/magazine/20001201/21124.html>, Retrieved from the Internet on Jul. 28, 2006.
Phillips, Margot et al. "Programming Contests: Two Innovative Models from New Zealand", Powerpoint presentation slides printout.
Pohl, Wolfgang, Suggestions for CS Competitions (Task, Exam, Automatic Grading) Powerpoint presentation slides printout, 7 pages, Dagstuhl, Germany, Jan. 24, 2006.
Pohl, Wolfgang, "Classification of Computer Science Competitions" Powerpoint presentation slides printout, 7 pages, Dagstuhl, Germany, Jan. 23, 2006.
Pohl, Wolfgang, "Computer Science Competitions for High School Students—Approaches to Classification and New Task Types", text and description, 8 pages.
Pohl, Wolfgang, "Computer Science Competitions for High School Students—Approaches to Classification and New Task Types", Extended Abstract, 7 pages.
Professor Keeps Score When Top Programmers Compete, California State University, Sacramento, Apr. 8, 1999 [retrieved on Jun. 16, 2003] Retrieved from the Internet: http://www.csus.edu/news/program.html.
Programming bids Buyers Request Programmers Bid—Retrieved from the internet, <http://rfg.programmingbids.com/cgi-bin/rfg/

(56) References Cited

OTHER PUBLICATIONS feedback.cgi?p=mamoon> Feedback provided by buyers by username mamoon, downloaded Aug. 8, 2006.
Programming Contest Control System (PC2) (<http://ecs.csus.edu/pc2/>, internet archive, retrieved from the internet Mar. 5, 2009) 2 pages.
Prove It! http://web.archive.org/web/20001018111056/www.proveit.com/ Retrieved on Oct. 21, 2008 (1 page).
Retrieved from the Internet, <http://www.bwinf.de/competition-workshop/papers.html>, listing of accepted papers, Jul. 12, 2006.
Retrieved from the Internet, <http://www.bwinf.de/competition-workshop/> information sheet, Jul. 12, 2006.
Reviewnet Screening: http://web.archive.org/web/20010110233500/http://reviewnet.net/ReviewNetScreening.html [Retrieved on Oct. 21, 2008 (3 pages).
Skaf, Charoy and Godart, "Maintaining Consistency of Cooperative Software Development Activities", Vandoeuvre-les-Nancy, France.
The Eiffel Stuggle 2000, Call for participation [online]. Aug. 2000, retrieved on Jul. 28, 2006]. Retrieved from the Internet: URL: http://www.elj.com/eiffel/struggle2000/cfp/, entire document.
The Rules of the 2001 ACM Regional Programming Contests Sep. 10, 2001, Final (from http://web.archive.org/web/20011224151037/icpc.baylor.edu/icpc/Regionals/About.htm), Retreived from the Internet Mar. 5, 2009 (5 pages).
TopCoder Homepage, <http://web.archive.org/web20010516213901/http://www.topcoder.com/> retrieved Oct. 19, 2006 (1 page).
TopCoder Press Release—InternetWire, May 29, 2001, "TopCoder addresses Demand for Elite Programmers with Coding Competitions", copy available at http://www.topcoder.com/tc?module=Static&d1=pressroom&d2=pr_052901.
U.S. Chess Federation : Rating Algorithm [Retrieved online Dec. 3, 2002] <http://www.uschess.org>.
USTA Rankings Systems Rules, Apr. 1998 [Retrieved online Oct. 20, 2008] <http://www.tornado.org/NATA/ByLaws/RankRules.html>.
Ward, Donald L. "Aircraft Information Systems Support SOL 9-BJ2-Z19-1-31I DUE 061401 POC" 2 pages, Jun. 11, 2001.
Wang, Hong et al. "Visualization, Antagonism and Opening—Towards the Future of the IOI Contest" for 1st Workshop on Computer Science Competitions Reform, Tsinghua University, Beijing, China.
Web Pages from Slashdot.org: http:Hdevelopers.slashdot.org/developers/04/01/'26/1834209.shtml?tid=136&tid=155&tid=187&tid=99 retrieved from the Internet on Jan. 28, 2004.
Web Pages from Scwatch.net: http//:www.scwatch.net/modules.php?name=Forums&file=viewtopic&t=16 Retrieved from the Internet on Jan. 28, 2004.
Web page www. cosource.com (Mar. 21, 2000), as provided by web.archive.org on Mar. 31, 2006 at http://web.archive.org/web/2000302160316/www.cosource.com.
WebValuate.com http://web.archive.org/web20001019020801/http://webvaluate.com/ Retrieved on Oct. 21, 2008 (1 page).
Weinrich and Altmann, "An Object-oriented Infrastructure for a Cooperative Software Development Environment", 1997, Linz, Austria.
Written Opinion for PCT/US05/001483 dated Jul. 7, 2006 (9 pages).
Written Opinion for PCT/US06/044131 (4 pages) (no technical effect).
Written Opinion for PCT/US07/06178 dated Nov. 12, 2008 (4 pages).
Written Opinion for PCT/US07/01535 dated Nov. 19, 2008 (4 pages).
Written Opinion for PCT/US07/009477 dated Nov. 7, 2008 (5 pages).
Written Opinion for PCT/US07/010414 dated Oct. 30, 2008 (4 pages).
Written Opinion for PCT/US07/12792 dated Oct. 27, 2008 (4 pages).
Written Opinion for PCT/US08/068101 (5 pages).
www.utest.com, webpage of About uTest by Roy Solomon dated Nov. 2007, retrieved from archive.org on Jan. 18, 2012, (1 page).
van der Vegt, Willem, "The CodeCup, an annual game programming competition" Paper for IOI-workshop, pp. 1-11.
Van Wegberg and Berends, "Competing communities of users and developers of computer software: competition between open source software and commercial software", May 2000, i, 1-13, University of Maastrict, The Netherlands.
Verhoeff, Tom "The IOI Is (Not) a Science Olympiad", Powerpoint presentation slides printout, Jan. 24, 2006, The Netherlands.
Verhoeff, Tom "The IOI Is (Not) a Science Olympiad", text and description, Oct. 2005, The Netherlands, 9 pages.
Voas, "Certifying Off-the-Shelf Software Components", Jun. 1998, 53-59, Sterling, VA.
Yakovenko, Bogdan "50% rule should be changed." pp. 1-4.
International Search Report for PCT/US08/082799 dated Jan. 12, 2009 (2 pages).
Web Page from utest.com: http://web.archive.org/web/20080117000514/http://www.utest.com/ Retrieved from the internet on Jun. 15, 2012.
Web Page from utest.com: http://web.archive.org/web/20080117000518/http://www.utest.com/about.html Retrieved from the internet on Jun. 15, 2012.
Web Page from utest.com: http://web.archive.org/web/20080117000549/http://www.utest.com/solutions.html Retrieved from the internet on Jun. 15, 2012.
Web Page from utest.com: http://web.archive.org/web/20080206093336/http://www.utest.com/press02.html Retrieved from the internet on Jun. 15, 2012.
Written Opinion for PCT/US08/082799 dated Jan. 19, 2009 (7 pages).

* cited by examiner

US 8,909,541 B2

SYSTEM AND METHOD FOR MANIPULATING SUCCESS DETERMINATES IN SOFTWARE DEVELOPMENT COMPETITIONS

RELATED APPLICATIONS

This application claims priority to, and the benefit of, International Patent Application Serial No. PCT/US2009/030593, filed on Jan. 9, 2009, which claims priority to and the benefit of U.S. provisional patent application Ser. No. 61/020,703, filed on Jan. 11, 2008, the entire disclosures of which are hereby incorporated by reference.

TECHNICAL FIELD

This invention relates to computer-based methods and systems for facilitating the development of an asset.

BACKGROUND INFORMATION

Competitions have been held for the development of an asset, such as essays, music, computer software, and so on.

In some competitions, a larger work is divided up into a number of smaller pieces, and competitions held for the development of those pieces. For example, a software program may be divided up into components, and competitions held for the development of each of the components. Development of a component may be divided into design tasks and coding tasks, and a contest held for the design of the component, and another contest held for the coding of the component.

Contest administrators attempt to determine whether a particular competition will result in an asset that will be useful. They also attempt to determine how much they should offer as a prize for the winner of the competition in order to provide sufficient incentive to obtain assets.

SUMMARY OF THE INVENTION

Various asset development competitions have been used to develop assets, such as content, computer software, graphics, user interfaces, and so forth. Such competitions have been held, for example, by TOPCODER, INC. of Glastonbury, Conn., and may be seen at http://www.topcoder.com.

As described in co-pending U.S. patent application Ser. No. 11/035,783, entitled SYSTEMS AND METHODS FOR SOFTWARE DEVELOPMENT by John M. Hughes, filed Jan. 14, 2005, incorporated herein by reference, a software application may be developed by contest, where the task of developing the software application is divided up into discrete tasks, and competitions are held for the performance of each of the discrete tasks. For example, a software program may be divided up into components, and competitions held for the development of each of the components. Development of a component may be divided into design tasks and coding tasks, and a contest held for the design of the component, and another contest held for the coding of the component.

As described in co-pending U.S. patent application Ser. No. 11/655,768, entitled SYSTEM AND METHOD FOR DESIGN DEVELOPMENT by John M. Hughes, filed Jan. 19, 2007, incorporated herein by reference, design contests may be held, for example, for graphics design and user interface development. Submissions in such contests may be evaluated for technical merit (i.e., meeting the described requirements) and/or based on customer affinity and/or appeal to a designated group of individuals.

As described in co-pending U.S. patent application Ser. No. 11/755,909, entitled PROJECT MANAGEMENT SYSTEM, by Messinger et al., filed May 31, 2007, incorporated herein by reference, a series of contests may be managed through use of project management system. Portions of a contest, such as a review effort, may begin when submissions are received, deadlines are met, and so on.

In various embodiments, techniques may be used to predict the likelihood of success of an asset development competition. A variety of factors may contribute to the success or failure of an asset development competition, and some data is particularly useful in making such a determination.

For example, in some embodiments, contestants provide indicia of interest in participating in competitions. For example, a competition registration process may include providing indicia of interest in participating in the competition. The indicia of interest may be received by a contest server, and in some cases communicated to an administrator. In some embodiments, contestants who have registered gain access to information useful in the competition, such as a web page or pages with detailed description of the desired asset, email list, discussion boards, and/or other information. Historical information about the registered participants' performance in past competitions may be used to determine whether a competition is likely to be successful. For example, if a number of registered participants have previously submitted acceptable assets in similar competitions, the competition may be likely to result in at least one asset that will be satisfactory.

Information about the likelihood of success may be used in a variety of ways.

In some embodiments, if the competition is not estimated to be likely to result in successful completion, steps may be taken to increase the estimated likelihood of success. For example, steps may be taken to attract additional contestants. Just as a few examples, a prize or reward offered to contestants may be increased, the competition may be modified, e.g., by subdividing the desired asset into pieces in order to make it easier for contestants to complete, and/or the time frame allowed for completion may be changed, just to give a few examples. Further, contestants who viewed information regarding the competition and/or who are qualified to participate but who did not register to participate may be contacted to determine why they chose not to participate. Potential participants with particular characteristics may be "recruited" with invitations directed towards them, or with increased or additional incentives that are likely to attract them.

In some embodiments, if a competition is determined to be likely to result in successful completion, the registration for the competition may be limited or closed to additional participants. In this way, a number of potential contestants may be allocated across a number of competitions. In some embodiments, one goal is to have enough participants that a competition will complete successfully but not more participants than are needed. This minimizes the number of people who compete but do not win, and also frees those participants to compete in other competitions, thereby allowing more work to get done.

In some embodiments, if a competition is determined to be likely to complete even if participation was limited or decreased, steps may be taken to decrease participation, for example, by decreasing prize money, inviting contestants to switch to another competition, and so on.

In general, in one aspect, a method for developing an asset by competition includes specifying standards for an asset, receiving from potential contestants indicia of interest in participating in an asset development competition in which the contestants compete to develop an asset, and determining an estimated likelihood that the asset development competition will result in an asset that meets the minimum standards based on historical information about the performance of the contestants from whom the indicia of interest were received. Steps may be taken to increase the estimated likelihood of success, upon a determination that the likelihood is less than desired. Upon a determination that the estimated likelihood is at or above a predetermined threshold, steps may be taken to limit or prevent registration by additional participants, or to decrease participation.

Systems may be implemented to automate the determination, and to monitor the change in determination with each new registrant. In this way, competitions may be automatically limited or closed, or prizes automatically increased and/or decreased, as suitable and/or necessary.

The methods and systems described can be implemented as software running on computers and other devices, for example, as described in the above-referenced co-pending patent applications. In some embodiments, the features described are implemented in a computer-based system for registration and management of competitions. In some such embodiments, changes to competition registration are made automatically by such the registration system, for example, closing competitions to additional participants in cases where there is a high likelihood of success, and, for example, automatically adding and/or increasing incentives and/or timelines (and/or automatically suggesting increases in incentives and/or timelines to an administrator for approval) in cases where there is insufficient likelihood of success.

In some embodiments, a competition registration and management system provides a report describing an estimated likelihood of success using average competition parameters, and also provides further estimates based on changes (e.g., decreased or increased incentives) to the competition parameters. This report may be provided prior to registration, based on the competitor pool, or during registration, based on the competitors who have registered. In this way, an administrator or customer can determine what prize amounts or other competition parameters and incentives to use. In some embodiments, prior to a competition, a competition registration and management system provides a competition administrator with suggested competition parameters based on a desired likelihood of success. The registration is then monitored, and an alert is sent to the competition administrator if the likelihood of success drops below the desired likelihood.

In general, in one aspect, a method for developing an asset by competition, includes: specifying minimum standards for an asset to an on-line competition registration system. The method includes receiving from the on-line competition registration system competition parameters determined by the on-line competition registration system to have a likelihood that the asset development competition will result in an asset that meets the minimum standards based on historical information about the performance of contestants. The method includes initiating an on-line competition using a competition server using the parameters received from the on-line competition registration system.

In general, in another aspect, a method for developing an asset by competition, includes specifying minimum standards for an asset to an on-line competition registration system receiving from the on-line competition registration system competition parameters determined by the on-line competition registration system to have a likelihood that the asset development competition will result in an asset that meets the minimum standards based on historical information about the performance of contestants, and initiating an on-line competition using a competition server using the parameters received from the on-line competition registration system.

In general, in another aspect, a method for developing an asset by competition, includes specifying minimum standards for an asset to an on-line competition registration system, receiving from potential contestants indicia of interest in participating in an asset development competition in which the contestants compete to develop the asset, and determining an estimated likelihood that the asset development competition will result in an asset that meets the minimum standards based on historical information about the performance of the contestants from whom the indicia of interest were received, and closing registration if the likelihood of an asset that meets the minimum standards is greater than a threshold value.

In general, in another aspect, a method for developing an asset by competition, includes specifying minimum standards for an asset to an on-line competition registration system receiving from potential contestants indicia of interest in participating in an asset development competition in which the contestants compete to develop the asset, determining an estimated likelihood that the asset development competition will result in an asset that meets the minimum standards based on historical information about the performance of the contestants from whom the indicia of interest were received, and automatically increasing incentives if the likelihood of an asset that meets the minimum standards is less than a threshold value after a specified time period has passed.

In general, in another aspect, a method for developing an asset by competition, includes specifying minimum standards for an asset to an on-line competition registration system, receiving from potential contestants indicia of interest in participating in an asset development competition in which the contestants compete to develop the asset, determining an estimated likelihood that the asset development competition will result in an asset that meets the minimum standards based on historical information about the performance of the contestants from whom the indicia of interest were received, and signaling to a competition administrator that incentives should be increased if the likelihood of an asset that meets the minimum standards is less than a threshold value after a specified time period has passed.

In general, in another aspect, a system for developing an asset by competition, includes a scoring subsystem for specifying minimum standards for an asset to an on-line competition registration system, a prediction subsystem for determining competition parameters that have a likelihood that the asset development competition will result in an asset that meets the minimum standards based on historical information about the performance of contestants, and an on-line competition registration system for initiating an on-line competition using a competition server using the parameters received from the on-line competition registration system.

In general, in another aspect, a system for developing an asset by competition includes a scoring subsystem for specifying minimum standards for an asset to an on-line competition registration system, a prediction subsystem for determining parameters that have a likelihood greater than a predetermined threshold that the asset development competition will result in an asset that meets the minimum standards based on historical information about the performance of contestants, an competition initiation subsystem for initiating an on-line competition using a competition server using the parameters received from the on-line competition registration system.

In general, in another aspect, a system for developing an asset by competition, includes a scoring subsystem for specifying minimum standards for an asset to an on-line competition registration system, an on-line competition registration system for receiving from potential contestants indicia of interest in participating in an asset development competition in which the contestants compete to develop the asset, a prediction subsystem for determining an estimated likelihood that the asset development competition will result in an asset that meets the minimum standards based on historical information about the performance of the contestants from whom the indicia of interest were received, and where the on-line registration system automatically closes registration for the competition if the likelihood of an asset that meets the minimum standards is greater than a threshold value.

In general, in another aspect, a system for developing an asset by competition, includes a scoring subsystem for specifying minimum standards for an asset to an on-line competition registration system, an on-line competition registration system for receiving from potential contestants indicia of interest in participating in an asset development competition in which the contestants compete to develop the asset, and a prediction subsystem for determining an estimated likelihood that the asset development competition will result in an asset that meets the minimum standards based on historical information about the performance of the contestants from whom the indicia of interest were received, and in which the on-line competition registration subsystem automatically increases incentives if the likelihood of an asset that meets the minimum standards is less than a threshold value after a specified time period has passed.

In general, in another aspect, a system for developing an asset by competition includes a scoring subsystem for specifying minimum standards for an asset to an on-line competition registration system, an on-line competition registration subsystem for receiving from potential contestants indicia of interest in participating in an asset development competition in which the contestants compete to develop the asset, a prediction subsystem for determining an estimated likelihood that the asset development competition will result in an asset that meets the minimum standards based on historical information about the performance of the contestants from whom the indicia of interest were received, and an alert subsystem for signaling to a competition administrator that incentives should be increased if the likelihood of an asset that meets the minimum standards is less than a threshold value after a specified time period has passed.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
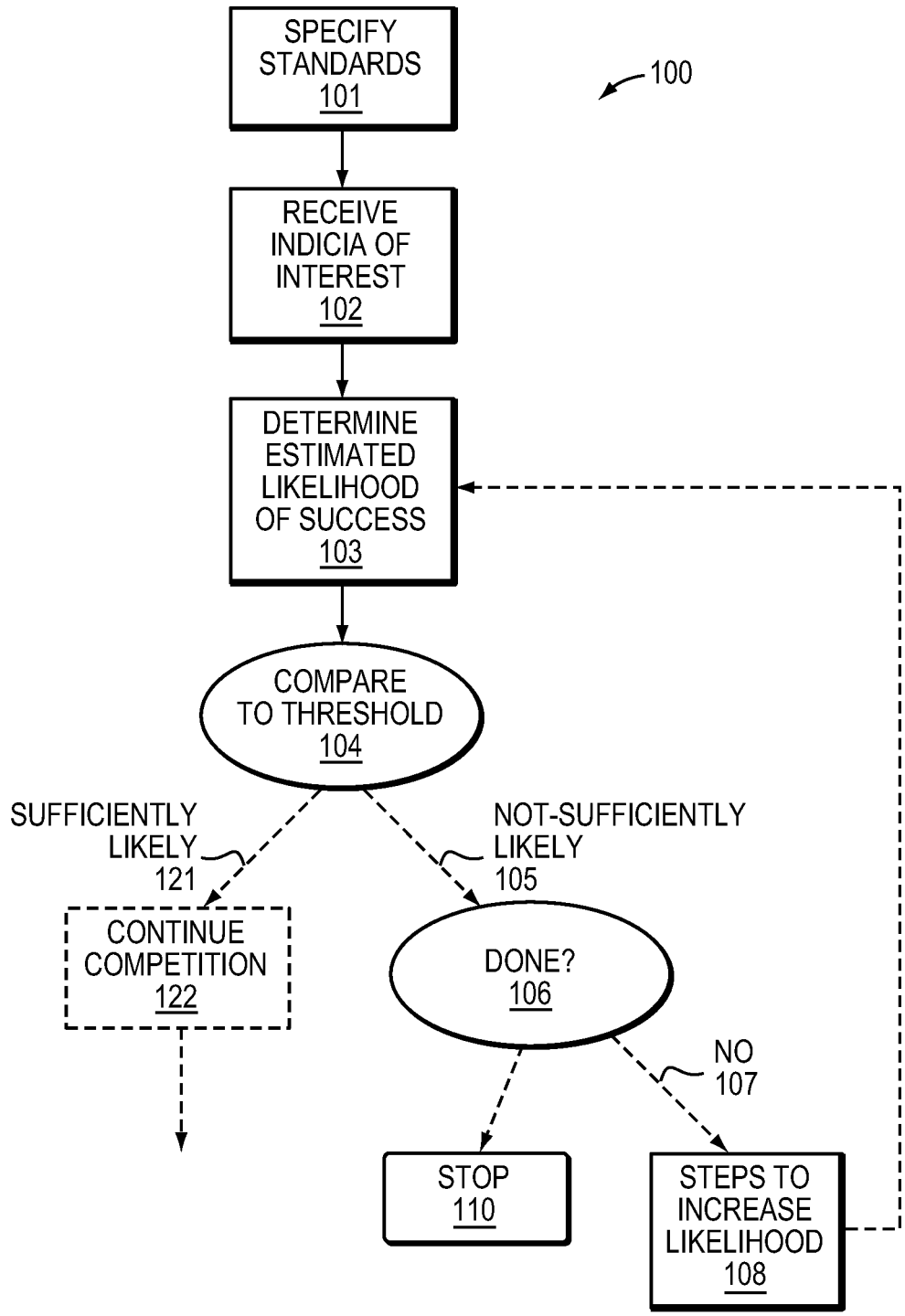
FIG. 1 is a flowchart illustrating by example a method for developing work product according to an embodiment of the invention.

Referring to FIG. 1, in some embodiments, a method 100 for developing an asset by competition may be applicable to any type of asset. Just as examples, not intended to be limiting, in various embodiments, the asset developed by competition may be or may include text, content, graphics, design, development, data, architecture, and/or specifications, for software, hardware, audio, video, music, machines, equipment, devices, and/or media. The competition may be any type of competition. Just as examples, not intended to be limiting, the competition may be an on-line competition, in-person competition, live competition, and/or timed competition. In some embodiments, the competition is an on-line competition for the development of a portion of a computer software application, such as a design for computer code, or such as computer code based on a design. In a preferred embodiment, the systems and methods described are implemented in a computer-based competition registration and management system, for registration and management of on-line competitions in which competitors participate over a computer network, such as a local area network and/or the internet.

Typically, a competition involves two or more participants competing to develop an asset. Standards are specified 101 for the asset. For example, the asset may need to meet certain minimum requirements to be acceptable. The standards may be described in a specification, checklist and/or scorecard. The standards may be general or specific as appropriate. In some embodiments, a review of each asset submitted by a competitor is conducted in order to identify a competition winner, and the review criteria include the relevant standards.

Indicia of interest in participating in an asset development competition are received from two or more contestants. The indicia of interest may be any suitable type of indication. In some embodiments, the indicia of interest is made as part of a competition registration process in which potential contestants are provided with information about a competition to develop an asset, and contestants may register via a competition web site to participate. For example, in some embodiments, registration for a competition may be the indicia of interest. In addition to (or instead of) communication via a competition web site, indicia of interest may be received by email, telephone, postal service, instant message, text message or any other means.

A determination 103 is made of an estimated likelihood that the asset development competition will result in an asset that meets the minimum standards. This determination may be made in a variety of ways, and any suitable technique may be used. Some such techniques are further described herein. In some embodiments, a determination is based on historical information about contestants from whom indicia of interest were received. Historical information may include the performance of such contestants in previous competitions.

In some embodiments, indicia of skill, such as a skill rating and indicia of reliability such as a reliability rating are assigned to contestants based on their participation in asset development competitions. The reliability indicia may reflect how consistently the contestant submits an asset in competitions in which the contestant has indicated interest. For example, in some embodiments, the reliability rating may be calculated as a percentage of the last n competitions that a contestant registers for in which that same contestant presents a timely submission that receives above a predetermined minimum score on a review scorecard. The number of competitions n included in the reliability rating may be 15 competitions, or any other suitable number, such as 10, 15, 20, 30, etc. The skill rating reflects the quality of the asset submitted by the contestant. An exemplary skill rating is described further below. In some embodiments, the estimated likelihood is determined by the reliability and skill ratings of contestants who have registered for the competition.

In one such embodiment, the estimated likelihood of success is determined according to a table, such as the exemplary TABLE 1 below. According to the exemplary table, if there are at least 4 registered contestants, and at least two of them have both a skill rating over the $50^{th}$ percentile and 80% or greater reliability rating, the estimated likelihood of success is 80%. With six registered contestants and at least 3 with a skill rating over the $50^{th}$ percentile and a reliability rating over 80%, and at least one with a rating over the $75^{th}$ percentile and a reliability rating over 80%, the estimated likelihood of success increases to 90%. Additional detail about the contestants (e.g., more granularity with respect to skill rating percentile and reliability, or ratings that are specific to particular types of competitions and/or technologies) and/or the competitions (e.g., prize amount, length, technology, difficulty, etc.) may be used in generating tables of the type shown in the exemplary TABLE 1. In some implementations, the table may be populated dynamically with current success data, where actual historical success percentages are used to determine the estimated likelihood of success. In some implementations, the table is populated and may be adjusted over time so that the estimates more accurately predict actual results.

example, the threshold may be 85%, and a comparison made to the estimated likelihood to determine whether the estimated likelihood is greater than the threshold. The threshold value may be higher or lower, for example, 70%, 75%, 85%, 90%, 95%, 98%, and so on, depending on the goals and how critical it is to have a higher probability that the competition will finish. It should be understood that any suitable threshold value may be used, and that the threshold value is not limited to a probability percentage, and may be a different number, depending on how the estimated likelihood is calculated.

If the estimated likelihood is less than desired, steps may be taken 108 to increase the estimated likelihood of success. A step may be as simple as waiting a longer period of time for more participants to communicate an indicia of interest. Affirmative steps also may be taken. For example, a prize or reward offered to contestants may be increased, the competition may be modified, e.g., by subdividing the desired asset into separate competitions in order to make it easier for contestants to complete, and/or the time frame allowed for completion may be changed, just to give a few examples. Further, contestants who viewed information regarding the competition but who did not register to participate and/or contestants who are qualified to participate but did not view the competition may be contacted to market the competition and/or determine why they chose not to participate. Potential participants with particular characteristics may be "recruited" with invitations directed towards them, or with incentives that are likely to attract them.

After steps are taken 108, a determination 103 may again be made of the estimated likelihood of success. The estimated likelihood again may be compared 104 to the threshold value, and if not sufficiently likely 105, further and/or continued steps may be taken 108.

In some embodiments, a determination may be made 106 about whether to continue and/or attempt additional steps. This determination 106 may be made automatically, manually, or in combination. In some cases, this determination about whether to continue may be based on time (e.g., 24

TABLE 1

EXAMPLE LIKELIHOOD OF SUCCESS TABLE

| Registered Contestants | Registered Contestants with Ratings Over $50^{th}$ Percentile and Reliability Over 80% | Registered Contestants with Ratings Over $75^{th}$ Percentile and Reliability Over 80% | Estimated Likelihood of Success |
|---|---|---|---|
| 3+ | 1 | 0 | 70% |
| 4+ | 2 | 0 | 75% |
| 4+ | 2 | 1 | 80% |
| 4+ | 2 | 2 | 85% |
| 6+ | 3 | 1 | 90% |
| 6+ | 3 | 2 | 95% |

In some embodiments, a table such as that shown in TABLE 1 is updated periodically, to reflect the actual success ratios obtained in competitions. In general, competitions are treated as unsuccessful when there are no submissions, or not enough submissions that meet minimum standards (e.g., no submissions, only one submission that meets minimum standards). The table can be modified to reflect current data, and as enough competitions are held, only more recent historical data used, to more accurately estimate the behavior of the contestants.

Figure 2:
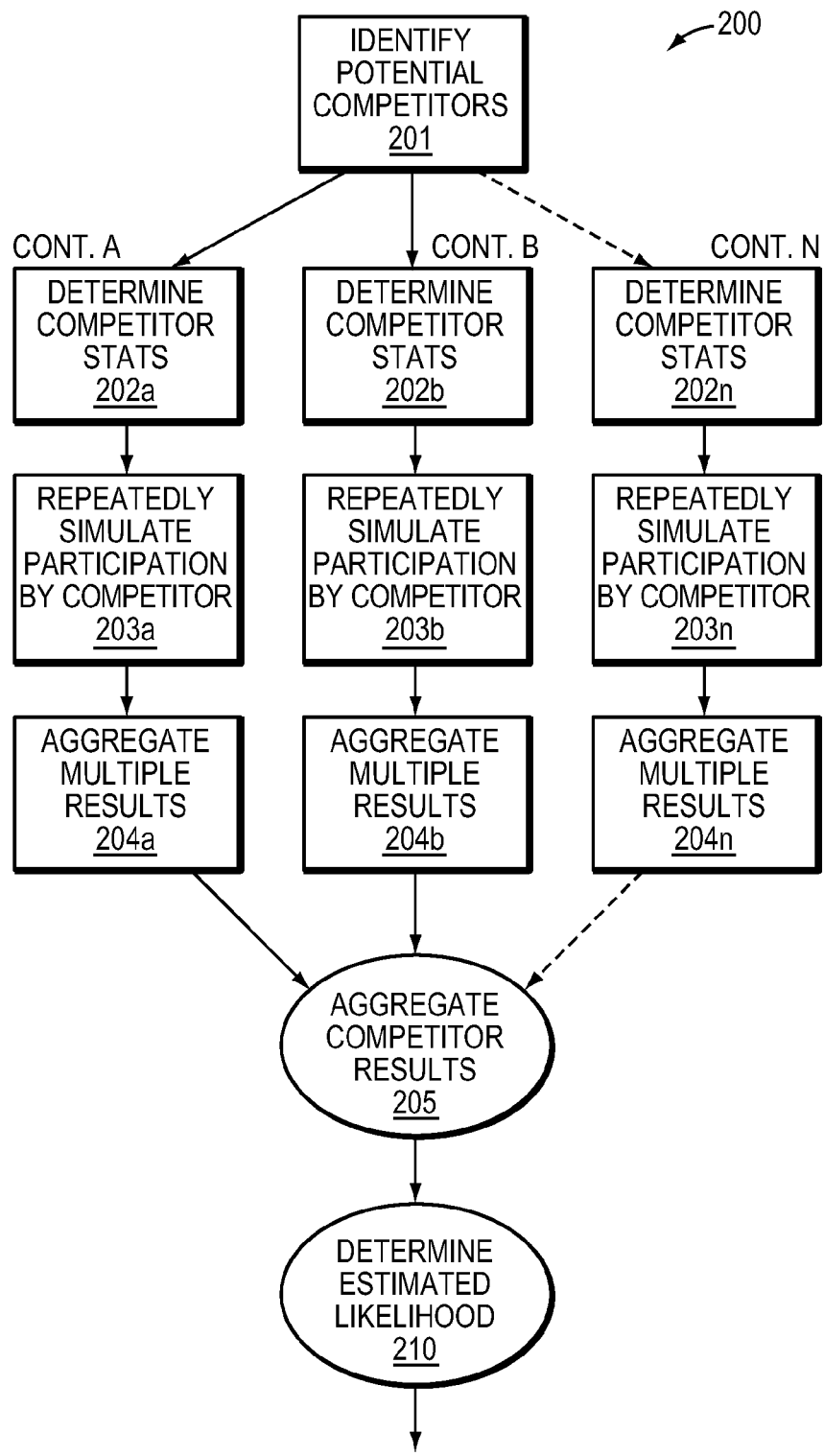
FIG. 2 is a flow chart illustrating by example a method for determining an estimated likelihood of success according to an embodiment of the invention.

Once determined, from a table such as that in TABLE 1, from a technique such as that shown in FIG. 2, a combination of them, or otherwise, the determined estimated likelihood may be compared 104 to a predetermined threshold 104. For hours, 48 hours, 1 week, etc.), based on the number of and amount of affirmative steps already taken, and/or other factors. In some embodiments, an evaluation is made of the steps that were taken, and the increase in estimated likelihood of success that resulted, if any. In some cases, the estimated likelihood is provided to an administrator with an alert, who makes the determination 106 about whether to proceed with an estimated likelihood lower than the initial threshold based on the activity. The alert may be an email or text message, warning display, audio, video, and so on. The determination may be automatic, involve time limits, administrators' priorities and preferences, and so on.

In some embodiments, if a competition is estimated to be sufficiently likely 121 to complete successfully, the competition continues on to another phase. In some embodiments, when success is sufficiently likely, competition registration may be closed, so that no additional contestants may participate. In the context of a site that holds multiple competitions at the same time, limiting new registrations for competitions that are likely to complete successfully allows potential contestants to be better allocated across a number of competitions. In some embodiments, a goal is to have enough participants in each competition such that a competition will complete successfully but not more. This minimizes the number of people who compete but do not win, and also frees up participants to compete in other competitions, thereby allowing more competitions to complete successfully.

In some embodiments, the determination 103 and comparison to a threshold 104 takes place at a regular interval, e.g., every minute, hour, day, and so on. After some time period, the steps to increase likelihood may include an alert, by screen display, email, and/or other method, to alert an administrator to the fact that the competition is not ready to continue 122 and that further steps 108 may be needed.

Referring to FIG. 2, in some embodiments, a contest outcome simulator may be used to make a determination 103 (FIG. 1) of an estimated likelihood of success. The simulator uses a Monte Carlo-type approach in which inputs to a computation are defined, and the computation is performed repeatedly, typically, a large number of times. In each calculation, one or more of the inputs are generated from historical or other known data, with some random variation introduced. The results from each of the computations are aggregated, and the aggregated result used.

In some embodiments, such a simulator uses historical data from other competitions, including which contestants registered, which contestants submitted, and final scores assigned to each submission. For a particular competition, a set of contestants is identified 201. In some embodiments, the identified set of contestants is the contestants who have provided indicia of interest in participating (e.g., registered) for a competition. In some embodiments, the identified contestants are potential participants who have downloaded or otherwise requested information about the competition. In some embodiments, the identified competitors are potential participants who have recently participated in similar competitions.

For each contestant, past performance statistics are calculated 202a, 202b, 202n, generally 202. It should be understood that there may be any number of contestants, represented by the three contestants shown in the figure as CONT. A, CONT. B and CONT. N in the figure. These statistics may be calculated at the time that the simulator is run, or in some embodiments, may be pre-calculated, for example, calculated at regular intervals for all contestants and/or calculated following the completion of each competition for all contestants who have participated, and so on.

In some embodiments, for each contestant, the statistics determined include a submission percentage (e.g., number of submissions/number of competitions), average score, and standard deviation of the scores from the average scores. Competitions in which a contestant did not submit may be omitted from the calculation of either score value.

The calculated statistics are used to repeatedly simulate participation in the current competition 203a, 203b, 203n, generally 203. The simulation is run a predetermined number of times. This number could be tuned for a particular competition, but typically would be in the order of 1,000,000 or larger. For example, the simulator may "determine" whether the simulated contestant submits by comparing a random number between 0 and 100 to the contestant's submission percentage. If the random number is equal to or less than the submission percentage, the contestant is said to have submitted in that simulated competition. If the simulated contestant submitted, the score for the submission is determined by starting with the average score and randomly selecting a variation within the standard deviation. In this way, a determination is made about whether the simulated contestant submitted and what score resulted for that run of the simulation.

The results of the repeated simulations are aggregated 204a, 204b, 204n, generally 204. In some embodiments, if a simulated contestant on average submitted greater than 50% of the time, the contestant is considered to have submitted successfully, and the average simulated score is used as the result for that contestant. If it is less than 50%, the output will indicate that the contestant did not expect to submit successfully for this simulated contest.

The results for all simulated contestants may be aggregated into a determination of the estimated likelihood of success of the competition with those participants. For example, if the result is one or more submissions with an expected score above the threshold, the estimated likelihood is high. An expected contest outcome may be determined.

Variations on this technique may include a more complicated analysis in which other variables are taken into account in the simulation. For example, price and/or competition time may be included, and/or with other variables, with the statistics adjusted for the results based on prize value, competition time, etc. A determination may be made for different prize values and/or contest lengths in order to determine the potential impact of increasing or decreasing the prize (e.g., before posting and/or after posting) and/or contest length.

In some embodiments, the technique of FIG. 2 may be applied to a determination 201 made for all known potential contestants (e.g., whether or not there is an indicia of interest) or a large subset of all known potential contestants who are most likely to participate. In such an application, the statistics 202 may be calculated for such competition parameters as price, competition length, technical subject matter, day/week/month of the competition, and so on. A predetermined number of simulations are made for each contestant 203 and the results aggregated 204. All contestant results are then aggregated 205 to determine 210 the likelihood that the competition will complete successfully. Competition parameters may be adjusted and the determination 200 recalculated, to determine the effect, for example, of increasing prize money, or shortening competition length.

Figure 3:
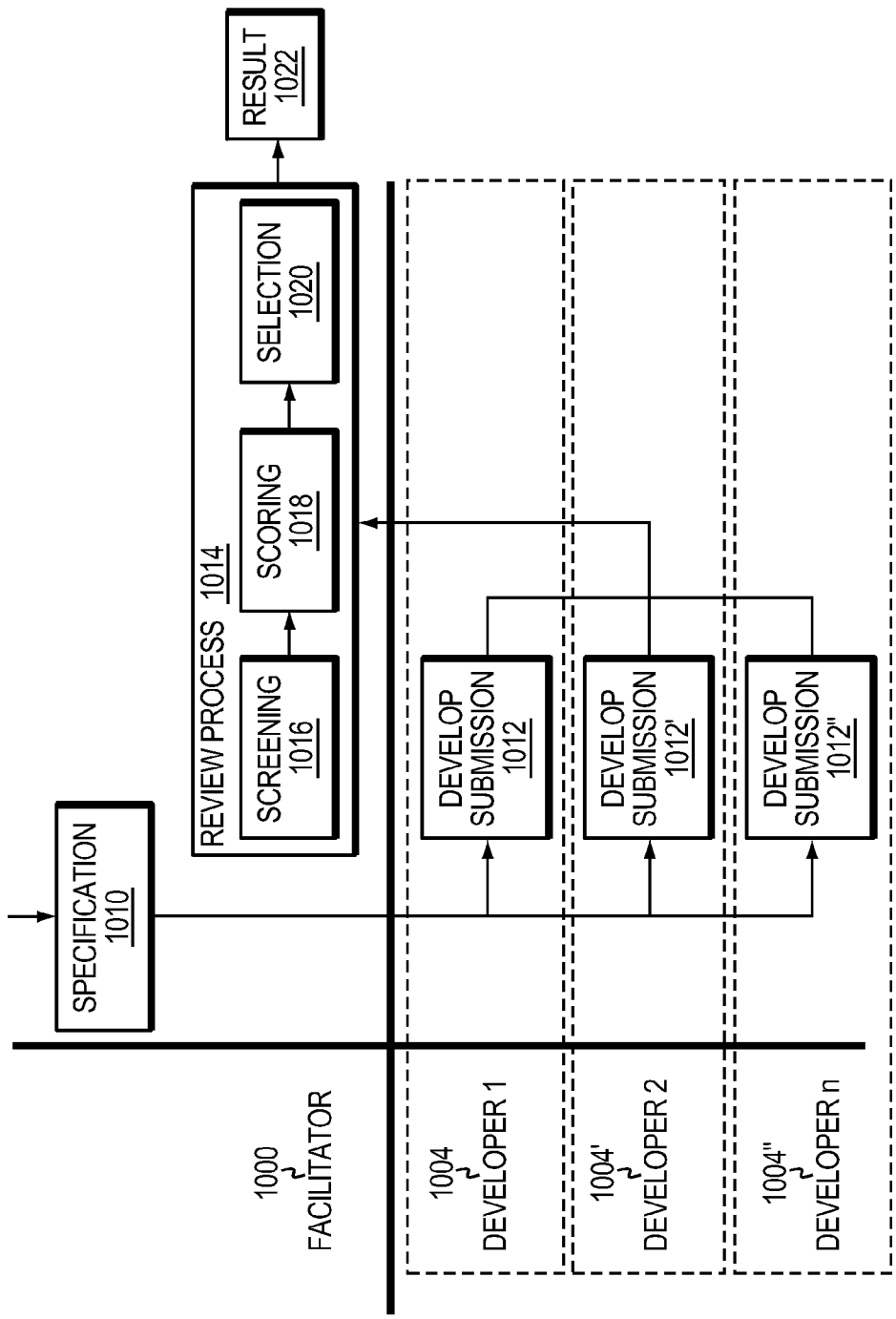
FIG. 3 is a block diagram illustrating by example an embodiment of a development contest.

Referring to FIG. 3, in one embodiment, one possible generalized implementation of a competition for the development of an asset is shown. This implementation is an example of competitions to which the techniques of FIG. 1 and FIG. 2 may be applied, but other types of competitions also may be suitable. Again, the asset may be any sort or type of asset that may be developed by an individual or group. As non-limiting illustrative examples, an asset may be a software program, logo, graphic design, specification, requirements document, wireframe, static prototype, working prototype, architecture design, component design, implemented component, assembled or partially-assembled application, testing plan, test cases, test code, documentation, and so on.

In some embodiments, the development process is monitored and managed by a facilitator 1000. The facilitator 1000 can be any individual, group, or entity capable of performing the functions described here. In some cases, the facilitator 1000 can be selected from the distributed community of contestants based on, for example, achieving exemplary scores on previous submissions, or achieving a high ranking in a competition. In other cases, the facilitator 1000 may be appointed or supplied by an entity requesting the development, and thus the entity requesting the competition oversees the competition.

The facilitator 1000 has a specification 1010 for an asset to be developed by competition. In general, a specification 1010 is intended to have sufficient information to allow contestants to generate the desired asset. In some cases, the specification 1010 may include a short list of requirements. In some cases the specification may include the result of a previous competition, such as a design, wireframe, prototype, and so forth. In some cases, the specification may be the result of a previous competition along with a description of requested changes or additions to the asset. The facilitator 1000 may review the specification 1010, and format or otherwise modify it to conform to standards and/or to a development methodology. The facilitator 1000 may in some cases reject the specification for failure to meet designated standards. The facilitator 1000 may mandate that another competition should take place to change the specification 1010 so that it can be used in this competition. The facilitator 1000 may itself interact with the entity requesting the competition for further detail or information.

The facilitator specifies rules for the competition. The rules may include the start and end time of the competition, and the awards(s) to be offered to the winner(s) of the competition, and the criteria for judging the competition. There may be prerequisites for registration for participation in the competition. In some cases, the specification may be assigned a difficulty level, or a similar indication of how difficult the facilitator, entity, or other evaluator of the specification, believes it will be to produce the asset according to the specification.

The specification is distributed to one or more developers 1004, 1004', 1004" (generally, 1004), who may be members, for example, of a distributed community of asset developers. In one non-limiting example, the developers 1004 are unrelated to each other. For example, the developers may have no common employer, may be geographically dispersed throughout the world, and in some cases have not previously interacted with each other. As members of a community, however, the developers 1004 may have participated in one or more competitions, and/or have had previously submitted assets subject to reviews. This approach opens the competition to a large pool of qualified developers.

The communication can occur over a communications network using such media as email, instant message, text message, mobile telephone call, a posting on a web page accessible by a web browser, through a news group, facsimile, or any other suitable communication. In some embodiments, the communication of the specification can be accompanied by an indication of the rules including without limitation the prize, payment, or other recognition that is available to the contestants that submit specified assets. In some cases, the amount and/or type of payment may change over time, or as the number of participants increases or decreases, or both. In some cases submitters may be rewarded with different amounts, for example a larger reward for the best submission, and a smaller reward for second place. The number of contestants receiving an award can be based on, for example, the number of contestants participating in the competition and/or other criteria.

The recipients 1004 of the specification can be selected in various ways. In some embodiments, members of the community may have expressed interest in participating in a particular type of asset development competition, whereas in some cases individuals are selected based on previous performances in competitions, prior projects, and/or based on other methods of measuring programming skill of a software developer. For example, the members of the community may have been rated according to their performance in a previous competition and the ratings may be used to determine which programmers are eligible to receive notification of a new specification or respond to a notification. The community members may have taken other steps to qualify for particular competitions, for example, executed a non-disclosure agreement, provided evidence of citizenship, submitted to a background check, and so forth. Recipients may need to register for a competition in order to gain access.

In one embodiment, a facilitator 1000 moderates a collaborative discussion forum among the various participants to answer questions and/or to facilitate development by the contestants. The collaborative forum can include such participants as facilitators, developers, customers, prospective customers, and/or others interested in the development of certain assets. In one embodiment, the collaboration forum is an online forum where participants can post ideas, questions, suggestions, or other information. In some embodiments, only a subset of the members can post to the forum, for example, participants in a particular competition or on a particular team.

Upon receipt of the specification 1010, one or more of the developers 1004 each develop assets to submit (shown as 1012, 1012' and 1012") in accordance with the specification 1010. The development of the asset can be done using any suitable development system, depending, for example, on the contest rules and requirements, the type of asset, and the facilities provided. For example, there may be specified tools and/or formats that should be used.

Once a developer 1004 is satisfied that her asset meets the specified requirements, she submits her submission, for example via a communications server, email, upload, facsimile, mail, or other suitable method.

To determine which asset will be used as the winning asset as a result of the contest, a review process 1014 may be used. A review can take place in any number of ways. In some cases, the facilitator 1000 can engage one or more members of the community and/or the facilitator and/or the entity requesting the asset. In some embodiments, the review process includes one or more developers acting as a review board to review submissions from the developers 1004. A review board preferably has a small number of (e.g., less than ten) members, for example, three members, but can be any number. Generally, the review board is formed for only one or a small number of related contests, for example three contests. Review boards, in some embodiments, could be formed for an extended time, but changes in staffing also can help maintain quality. In some embodiments, where unbiased peer review is useful, the review board members are unrelated (other than their membership in the community), and conduct their reviews independently. In some embodiments, reviewers are allocated such that they only infrequently work on the same contests.

In some embodiments, one member of the review board member is selected as a primary review board member. In some cases, a facilitator 1000 acts as the primary review board member. The primary review board member may be responsible for coordination and management of the activities of the board.

In some embodiments, a screener, who may be a primary review board member, a facilitator, or someone else, screens 1016 the submissions before they are reviewed by the (other) members of the review board. In some embodiments, the screening process includes scoring the submissions based on the degree to which they meet formal requirements outlined in the specification (e.g., format and elements submitted). In some embodiments, scores are documented using a scorecard, which may be a document, spreadsheet, online form, database, or other documentation. The screener may, for example, verify that the identities of the developers 1004 cannot be discerned from their submissions, to maintain the anonymity of the developers 1004 during review. A screening review 1016 may determine whether the required elements of the submission are included (e.g., all required files are present, and the proper headings in specified documents). The screening review can also determine that these elements appear complete.

In some embodiments, the screening 1016 includes initial selection by the entity that requested the competition. For example, if the competition is for a wireframe, the entity may select the wireframes that seem to be the best. This smaller group may then go on to the next step.

In some embodiments, the screener indicates that one or more submissions have passed the initial screening process and the reviewers are notified. The reviewers then evaluate the submissions in greater detail. In preferred embodiments, the review board scores the submissions 1018 according to the rules of the competition, documenting the scores using a scorecard. The scorecard can be any form, including a document, spreadsheet, online form, database, or other electronic document. There may be any number of scorecards used by the reviewers, depending on the asset and the manner in which it is to be reviewed.

In some embodiments, the scores and reviews from the review board are aggregated into a final review and score. In some embodiments, the aggregation can include compiling information contained in one or more documents. Such aggregation can be performed by a review board member, or in one exemplary embodiment, the aggregation is performed using a computer-based aggregation system. In some embodiments, the facilitator 1000 or a designated review board member resolves discrepancies or disagreements among the members of the review board.

In one embodiment, the submission with the highest combined score is selected as the winning asset 1020. The winning asset may be used for implementation, production, or for review and input and/or specification for another competition. A prize, payment and/or recognition is given to the winning developer.

In some embodiments, in addition to reviewing the submissions, the review board may identify useful modifications to the submission that should be included in the asset prior to final completion. The review board documents the additional changes, and communicates this information to the developer 1004 who submitted the asset. In one embodiment, the primary review board member aggregates the comments from the review board. The developer 1004 can update the asset and resubmit it for review by the review board. This process can repeat until the primary review board member believes the submission has met all the necessary requirements. In some embodiments, the review board may withhold payment of the prize until all requested changes are complete.

In some embodiments, a portion of the payment to the designer is withheld until the until after other competitions that make use of the asset are complete. If any problems with the asset are identified in the further competitions, these are provided to the reviewer(s) and the developer, so that the requested changes can be made by the developer 1004.

There can also be prizes, payments, and/or recognition for the developers of the other submissions. For example, the contestants that submit the second and/or third best submissions may also receive payment, which in some cases may be less than that of the winning contestant. Additional prizes may be awarded for ongoing participation and/or reliability. Payments may also be made for creative use of technology, submitting a unique feature, or other such submissions. In some embodiments, the software developers can contest the score assigned to their design, program, or other submissions.

It should be understood that the development contest model may be applied to different portions of work that are required for the development of an overall asset. A series of development contests is particularly applicable to assets in which the development may be divided into stages or portions. It can be beneficial in many cases to size the assets developed in a single competition such that work may be completed in several hours or a few days. The less work required to develop a submission, the lower the risk for the contestants that they will not win.

Figure 4:
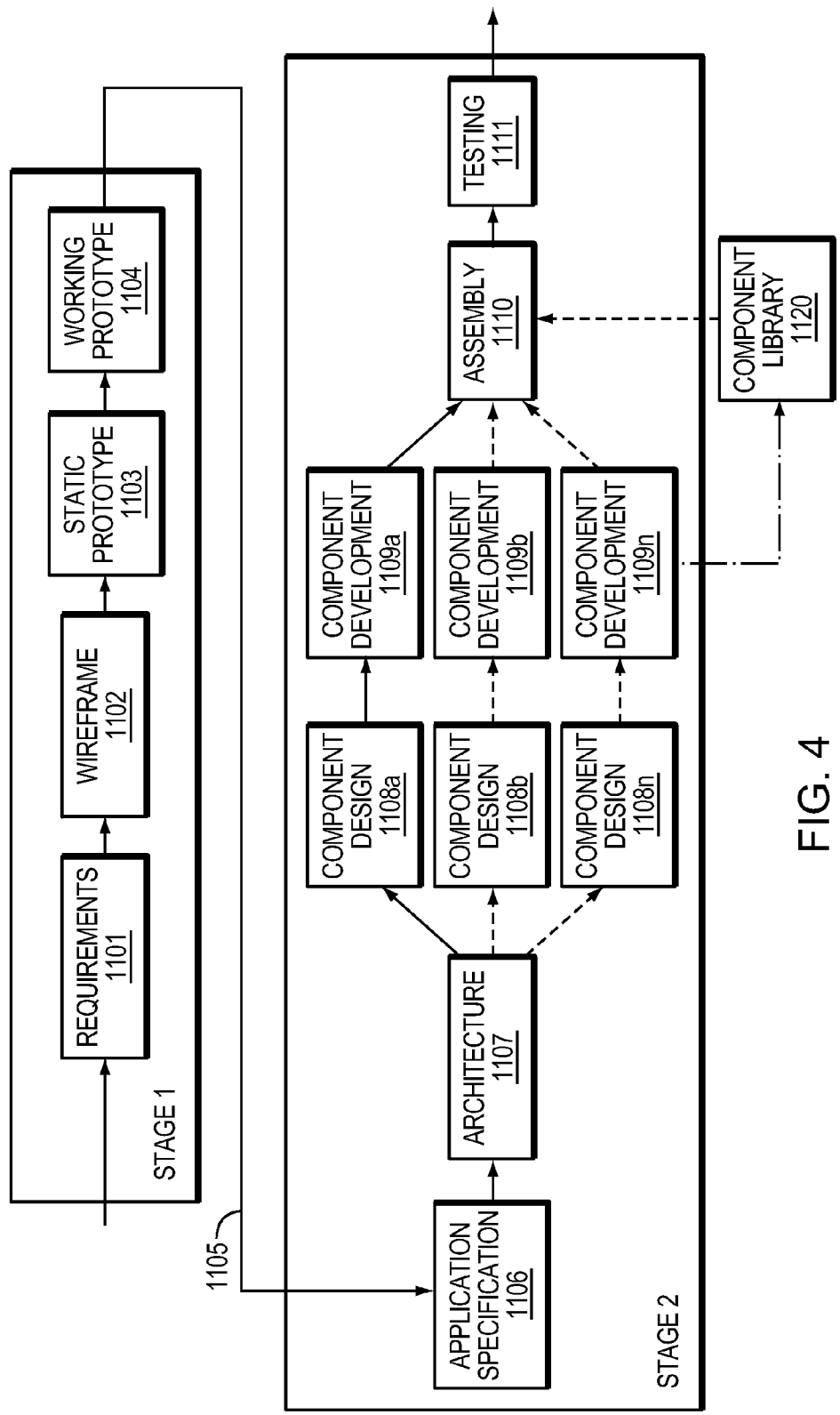
FIG. 4 is a block diagram illustrating by example an embodiment of a contest-based software application development process.

Referring to FIG. 4, in one illustrative example of a series of competitions, steps for development of a software application are shown. While described as an illustrative example in some places as a web application, it should be understood that any sort of software application, with any type of architecture, including without limitation mobile applications, client/server applications, thin-client applications, to give a few examples, may be suitable for this type of development process.

A series of contests may be held to develop the software application. For example, a person, referred to as a customer, may have an idea or concept for a software application. The idea may be, for example, thought-out in detail or only with a high level of description. A series of development competitions (with each such competition, for example, operating as shown with respect to FIG. 3) may be held, starting with the specification of the concept. For example, a contest may be held for the development of application requirements 1101. In such a contest, the initial description and documentation provided by the customer may be used as part of the contest specification 1010 (FIG. 3). The asset to be developed in the competition is requirements documentation. It may that the contestants need to interact with the customer to develop the requirements. Typically, this interaction would take place on a forum that is open to all of the contestants. The review of the requirements may involve one or more peer reviewers (i.e., members of the contestant community), as well as the customer. The selection of a requirements document may be based on the degree to which it represents the concept presented, the actual desires of the customer, and technical understanding and feasibility.

The requirements documentation that is developed in the requirements contest 1101 may then be used as part of the contest specification 1010 (FIG. 3) for a wireframe competition 1102. The wireframe contest 1102 may be held for the development of a wireframe (e.g., a visual guide used to suggest layout and placement of fundamental design elements in the interface design) of the application. The wireframe typically lays out the interface of the application, and presents visually the way that a user will interact with the application software. The review of the wireframes may involve one or more peer reviewers (i.e., members of the contestant community), as well as the customer. The selection of a wireframe may be based on the degree to which it implements the requirements, the actual desires of the customer, and technical understanding and feasibility.

When the wireframe contest 1102 is complete, a contest may be held for the development of a static prototype (e.g., an implementation of a web site in HTML or other markup language, typically without data persistence or other server-based functionality) using the wireframes as a starting point. The static prototype shows screen displays as they would look in the application, but does not have implemented functionality. The review of the static prototype may involve one or more peer reviewers (i.e., members of the contestant community), as well as the customer. The selection of a static prototype may be based on the degree to which it implements the requirements, the actual desires of the customer, and technical understanding and feasibility.

When the static prototype contest 1103 is complete, a contest may be held for the development of working prototypes (e.g., working implementations) based on the static prototypes. The working prototype is code that implements the requirements, wireframes, and static prototypes, along with any other comments or instructions provided by the customer. This working prototype may have certain restrictions or requirements that are described in the contest specification 1010 (FIG. 3). The working prototype may not need to be highly scalable, or enterprise quality, but merely good enough to try and permit customer use.

By having a customer involved in the requirements for and selection of the deliverables, a contest-based development process results in the efficient creation of software that the customer is happy with. At any stage in the process, if a customer is not happy with the final results, the customer can hold another contest, to review or revise the previous asset with new or changed requirements.

The working prototype may be sufficient for some customers 1105 as a useful application. For others, the working prototype is a first step for confirming the desired requirements for a software application. Once they have used and tested the functionality of the working prototype, the working prototype may be used as the input to another series of competitions for development of an enterprise quality software application.

Shown as "STAGE 2" in the figure, another series of contests, beginning with the development of an application specification 1106 based on the working prototype may be held. In some such embodiments, a contest for development of an application specification 1106 may be held. The contest specification 1010 (FIG. 3) may include the winning working prototype and information about changes requested from the working prototype. Other information that may be included in the contest specification 1010 (FIG. 3) may include the required format and scope of the application specification. In one embodiment, the application specification is a requirements specification, including screen displays, functionality description, and so forth. A customer may participate on a review board and/or on-line discussion for a specification competition, particularly to fill in any gaps, or to clarify any problems with the inputs to the specification competition. Of course, the specification competition could be held without a working prototype (if STAGE 1 is skipped) or just using wireframes and/or static prototypes as input. Likewise, a customer may just develop its own specification, and/or engage a consultant to develop a specification.

Once the winning application specification is selected, it may be used as the contest specification 1010 (FIG. 3) for an architecture competition. The asset(s) that may be developed as part of the architecture competition may include an overall architectural design, as well as a description of components that may be used to build the application. An architectural design may include a description of new components that may be built as part of other competitions 1108, 1109, or as existing components from a component library 1120. When a winning architecture is selected, the resulting component specification(s) may be used an input for component design competition(s) 1108. A customer may participate on a review board for an architecture competition, particularly if the customer has architecture expertise. The customer may be particularly interested in the interfaces and integration with its other systems. Typically, it is useful to have skilled architects working on the review board for an architecture competition, to identify technical issues with the architectural design.

In some embodiments, the components specified in the winning architecture may be developed by holding a series of component design competitions 1108. The winning component designs are then used as input for component development competitions 1109. As illustrative examples, component design and development competitions have been described, for example, in the above-referenced U.S. patent application Ser. No. 11/035,783. When all components have been completed, they may be assembled in assembly competitions 1110. Finally, test scripts may be developed, tested, and run in testing competitions 1111. At the completion of STAGE 2, an enterprise-ready software application that meets the requirements is completed.

In some embodiments, reusable assets may be provided to increase the speed of development in each of the various stages. For example, templates, graphics, tools, design patterns, and so forth may be used to increase the productivity of the contestants, and to give a common style to make evaluation and integration easier.

It should be understood that one, two, or more of the steps may be performed in a different order, or combined or omitted. For example, in STAGE 1, there may not be a need for a requirements competition 1101. Rather, the contestants in the wireframe may start from the description provided by the customer, and ask questions in a forum or otherwise to generate their wireframes, without use of more formal requirements documentation. Likewise, there may be at any stage multiple competitions and/or multiple levels of competitions. For example, for a complex application, there may be an overall architecture design, and then individual competitions for the architecture design of subassemblies. The architecture of the subassemblies may be designed, needed components built, and the subassemblies assembled. The subassemblies may then be assembled into complete application in an additional competition or competitions. Testing competitions may be held for various portions of an application, for example, for a subassembly, or for a distinct portion of an application, such as a user interface with another competition held for testing of back-end functionality.

It also should be understood that development by a series of contest is flexible, in that contests can be repeated if the results were not as expected, or if additional changes or new functionality is desired. Likewise, a customer can undertake as much work as it likes through development by other methods, for example, by using internal staff or outside consultants. For example, rather than holding a contest 1104 for a working prototype, a customer can take the static prototype, and develop the working prototype itself.

In some embodiments, where the assets developed outside of the contest environment are being used as the input to another contest, it may be useful to engage reviewers to review the asset. For example, a static prototype review can be conducted on a static prototype developed by a customer before that static prototype is used as input to the working prototype contest 1104. As another example, in STAGE 2, an entity might develop a specification itself, engage reviewers to review the specification, then use the specification in a contest for some or all of the architecture, hold a contest for development of some or all of the components, and then assemble the application itself. A review can be conducted on the assembly, and a testing competition held to develop test scripts and other functionality.

In some embodiments, a "project plan" competition may be held prior to the competitions described. In the project plan competition, contestants develop a plan for development of the customer's project needs. For example, the plan may specify a series of development contests and timeframes for developing the desired software application. The plan may provide approximate costs, based on historical or other data, for similar competitions. The plan may include development strategies, and assumptions about customer participation. A project plan may be specified as a series of competitions, which may then be monitored through interaction with a competition management server. One asset developed in such a plan may be a configuration of contests as specified in a project management system, such as that described in co-pending U.S. patent application Ser. No. 11/755,909.

In one embodiment, a competition web site provides a registration process for a development project. Following project registration, a customizable dashboard, or "cockpit" is configured with a variety of functional widgets with which a customer can begin the process of having development work done by a member community. The customer can launch competitions and track projects through delivery and member payment. In some embodiments, the web site project-specific public or private 'group' pages, generated by the customer from the cockpit, on which the nature of the project can be described, relevant attachments can be viewed, and the customer can openly communicate with members via a bulletin board or forum to answer questions, receive suggestions, and so on. In some embodiments, these pages allow participants to see the evolution of the project, interact, collaborate, provide status reports, and make delivery.

In some embodiments, representatives of a customer, and members in different roles, may have access to different capabilities for the project. For example, some customers may be able to post projects, while others may only be able to review status, and other review and approve payments.

In some embodiments, a dashboard page serves as an entry point for customers to interact with the TopCoder Community. From this dashboard page, a registered customer may launch and track projects, send and receive messages and monitor a variety of information sources. The dashboard may include a profile box with information about the individual, and a link to other information, or to update the information, a button that allows the launching of a project, a button or link for help and "how-to" information, navigation to other pages, such as contests and discussion forums, and in some cases space for broadcast messages or advertising, search field, and so forth. In some implementations, the page is customizable, with a framework allowing for "widgets" to be dragged and dropped into place into a user-configured order.

In some embodiments, the dashboard includes a widget that provides information about the user's projects, which maybe updated dynamically, such as the project name, the status of the project, the name of the personnel associated with the project, the status of the project, the status of payments, the number of contest participants, the number of submissions, the project phase, whether there are new forum posts (and in some cases, information or a link to the post(s)).

In some embodiments, the dashboard includes a messaging widget that indicates whether new messages are waiting, and allows a user to compose new messages. In some embodiments, a team widget shows information about individuals who are working on a current project, or, for example, a past project, or have been designated for another reason to be included. An RSS feed widget provides an indication of whether content has been added to a particular web page. A news widget provides information about new features, or, for example, newly-available components that may be used in a competition.

Skill Ratings.

In some embodiments, contestants skills are rated according to the following technique. After each competition, each contestant who submitted an asset in the competition is re-rated according to the following algorithm. In some embodiments, the last 50 scored asset submissions are used, excluding the contestant's own previous submissions. The ranking of each contestant is then determined based on the score the contestant received compared to the scores of the last 50 scored asset submissions. The rating used for the previous scores is the rating of the contestant at the time the contestant submitted the asset. The average rating of everyone is then calculated:

$$AveRating = \frac{\sum_{i=1}^{NumCoders} Rating_i}{NumCoders}$$

Where NumCoders is the number of contestants in the competition and Rating is the rating without the volatility of the contestant in the competition before the competition.

A competition factor is calculated:

$$CF = \sqrt{\frac{\sum_{i=1}^{NumCoders} Volatility_i^2}{NumCoders} + \frac{\sum_{i=1}^{NumCoders} (Rating_i - AveRating)^2}{NumCoders - 1}}$$

Where Volatility is the volatility of the contestant in the competition before the competition.

A Win Probability WP is estimated:

$$WP = 0.5\left(erf\left(\frac{Rating1 - Rating2}{\sqrt{2(Vol1^2 + Vol2^2)}}\right) + 1\right)$$

where Rating1 & Vol1 are the rating and volatility of the contestant being compared to, and Rating2 & Vol2 are the rating and volatility of the contestant whose win probability is being calculated. Erf is the error function, which is the "error function" encountered in integrating the normal distribution (which is a normalized form of the Gaussian function):

$$erf(z) \equiv \frac{2}{\sqrt{\pi}} \int_0^z e^{-t^2} dt.$$

The probability of the contestant getting a higher score than another contestant in the competition (WPi for i from 1 to NumCoders) is estimated. The expected rank of the contestant is calculated:

$$ERank = .5 + \sum_{i=1}^{NumCoders} WP_i$$

The expected performance of the contestant is calculated:

$$EPerf = -\Phi\left(\frac{ERank - .5}{NumCoders}\right)$$

Where $\Phi$ is the inverse of the standard normal function.
The actual performance of each contestant is calculated:

$$APerf = -\Phi\left(\frac{ARank - .5}{NumCoders}\right)$$

Where ARank is the actual rank of the contestant in the competition based on score (1 for first place, NumCoders for last). If the contestant tied with another contestant, the rank is the average of the positions covered by the tied contestants. The performed as ("PerfAs") rating of the contestant is calculated:

PerfAs=OldRating+$CF$*($A$Perf−$E$Perf)

The weight of the competition for the contestant is calculated:

$$Weight = \frac{1}{\left(1 - \left(\frac{.42}{(timesPlayed+1)} + .18\right)\right)} - 1$$

Where TimesPlayed is the number of times the contestant has been rated before.

To stabilize the higher rated members, the Weight of members whose rating is between 2000 and 2500 is decreased 10% and the Weight of members whose rating is over 2500 is decreased 20%.

A cap is calculated:

$$Cap = 150 + \frac{1500}{TimesPlayed + 2}$$

The new volatility of the contestant is calculated:

$$NewVolatility = \sqrt{\frac{(NewRating - OldRating)^2}{Weight} + \frac{OldVolatility^2}{Weight+1}}$$

The new rating of the contestant is calculated:

$$NewRating = \frac{Rating + Weight * PerfAs}{1 + Weight}$$

|NewRating−Rating|>Cap, the NewRating is adjusted so it is at most Cap different than Rating.

Predictor Framework

Figure 5A:
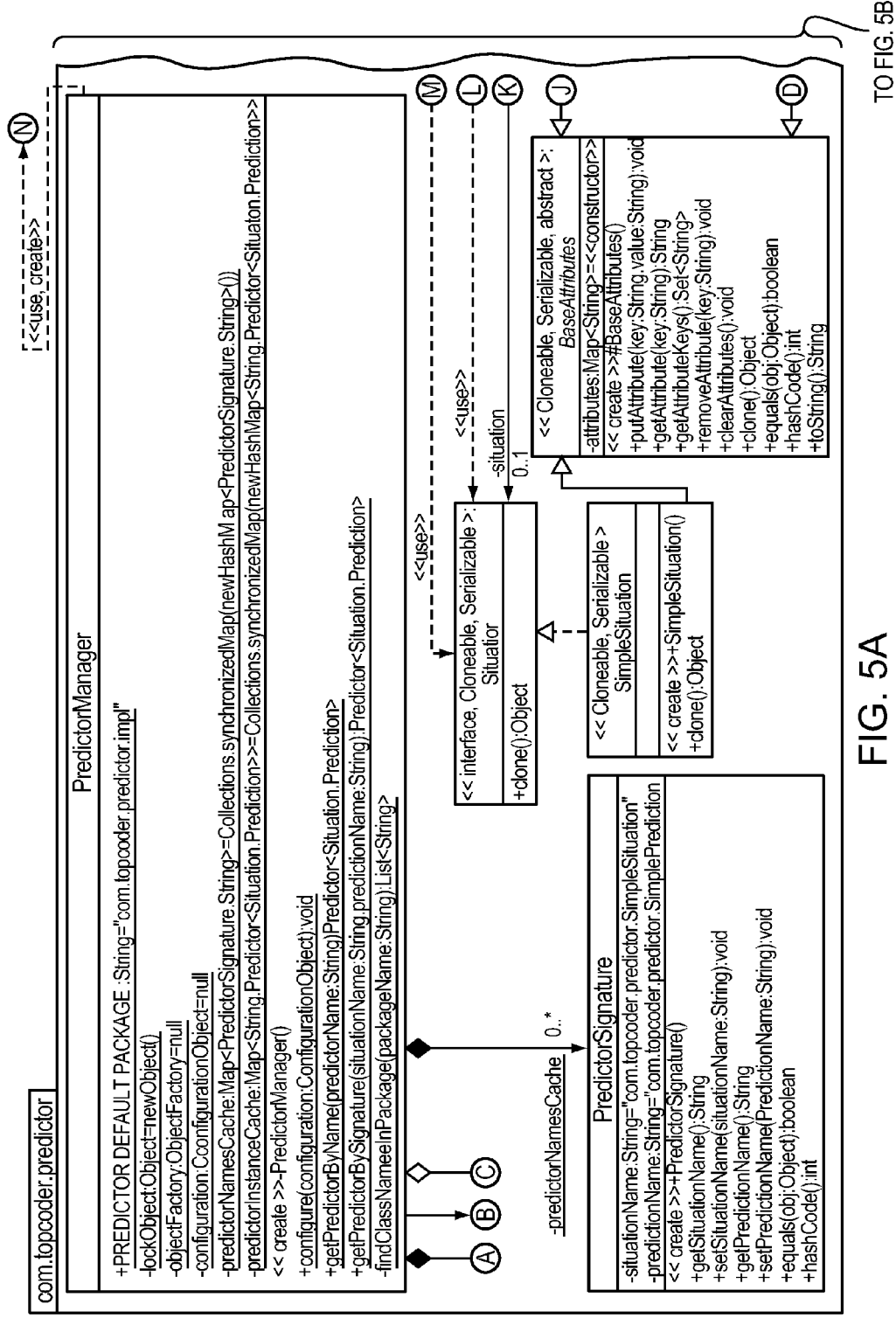
FIGS. 5A, 5B, 5C and 5D collectively illustrate a class diagram illustrating by example an embodiment of a prediction framework.
Figure 5B:
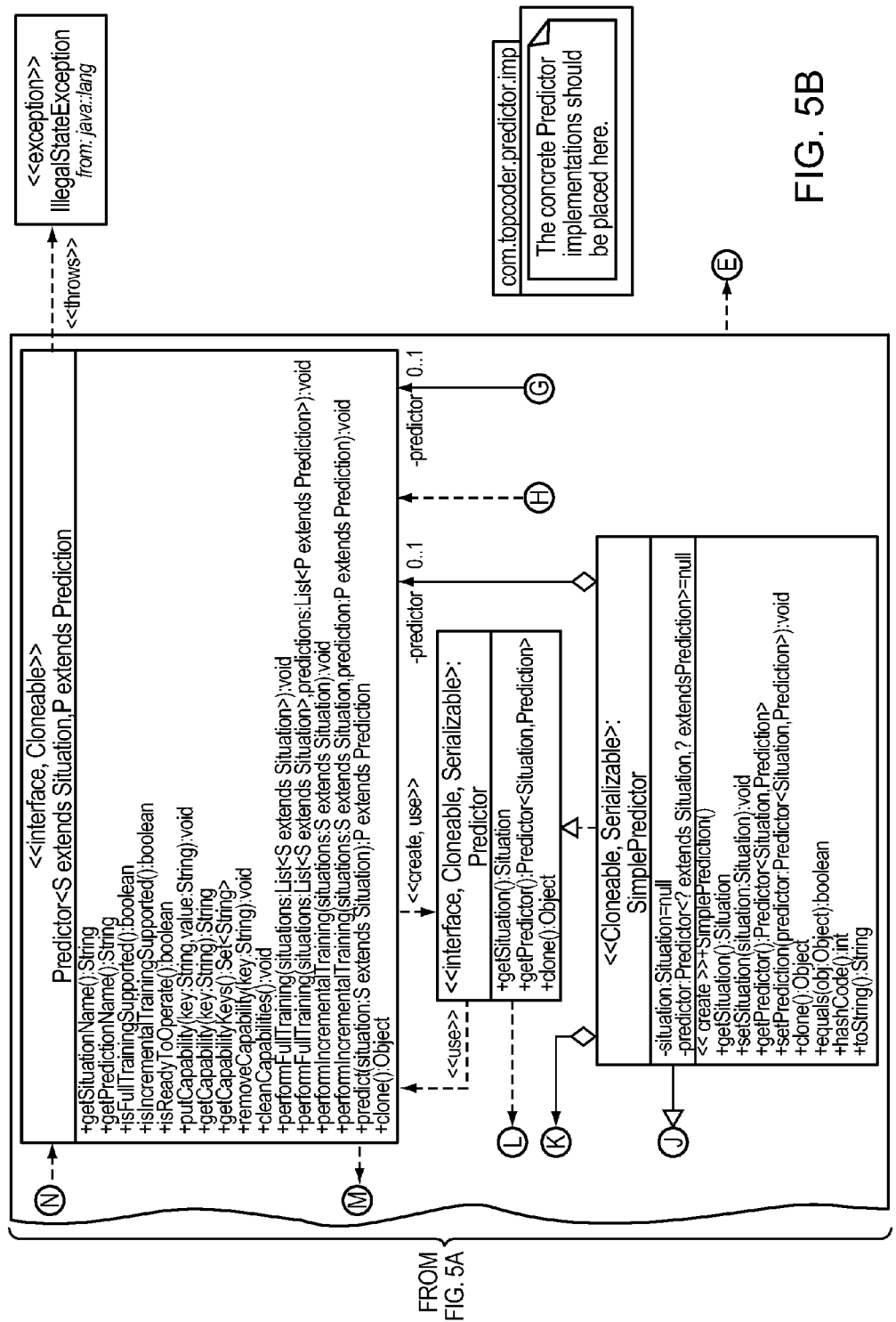
Figure 5C:
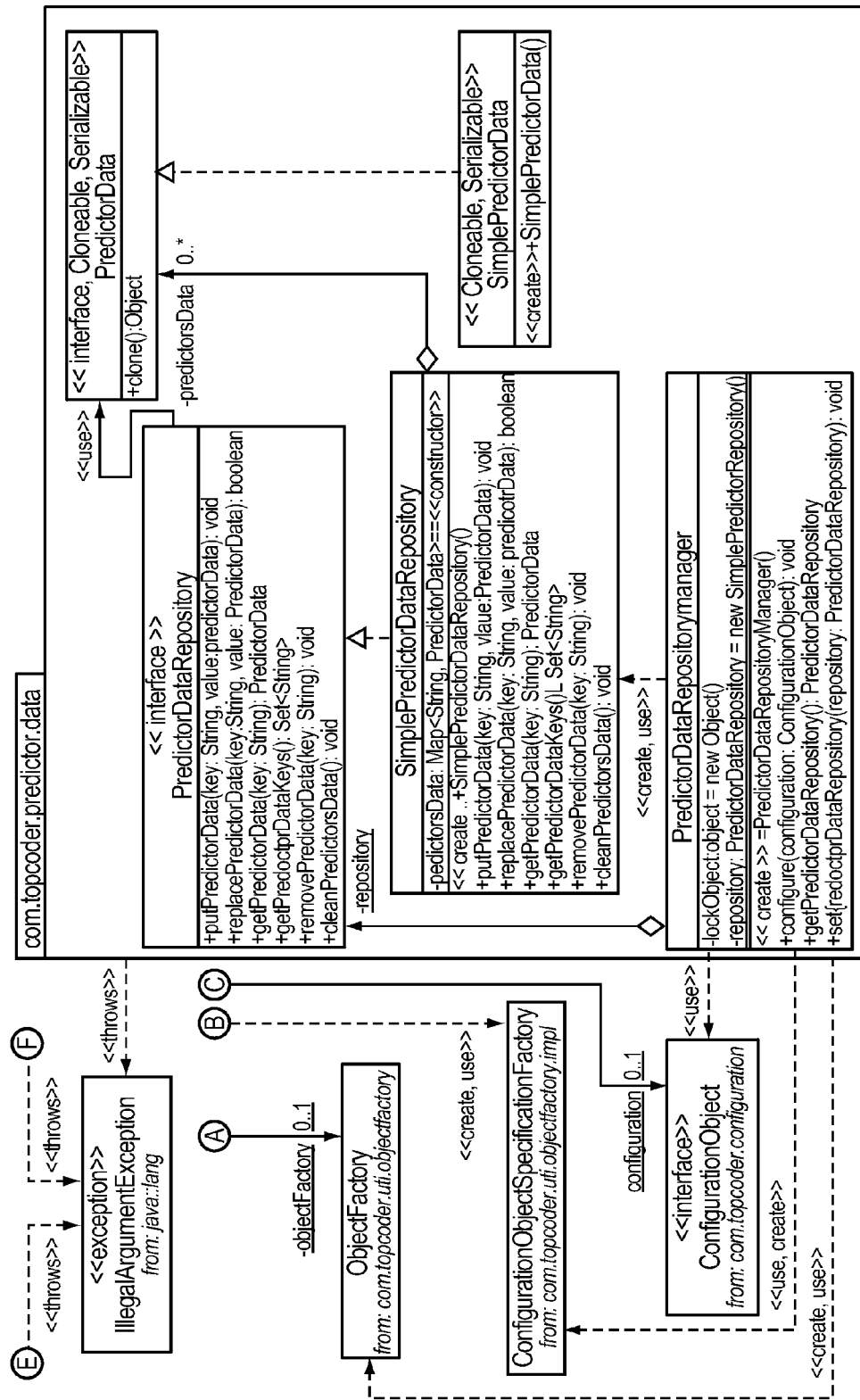
Figure 5D:
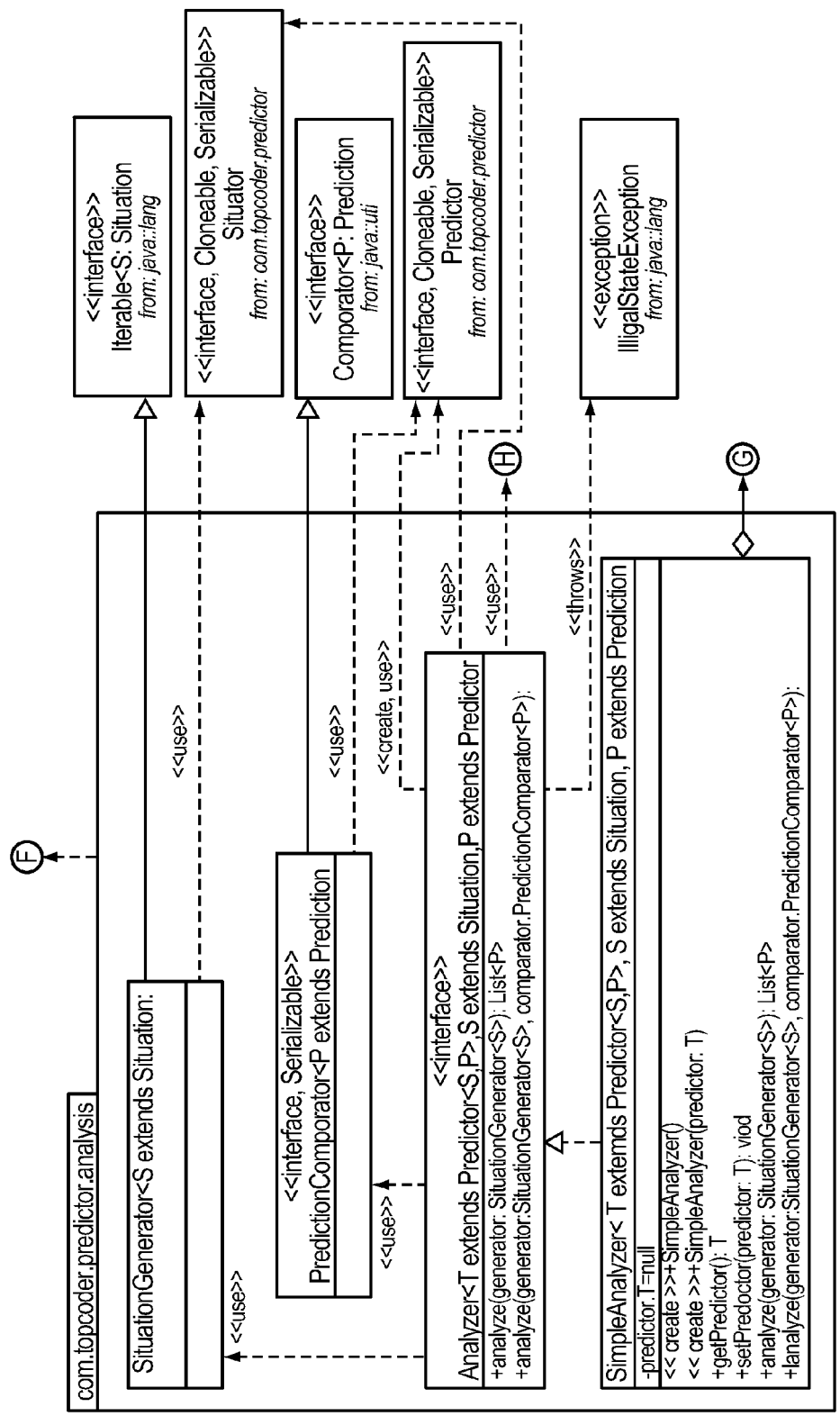

Referring to FIGS. 5A, 5B and 5C collectively, in one embodiment, a prediction framework is used for the implementation of one or more predictive algorithms. Each predictive algorithm takes as its input a description of a situation, and produces as its output a prediction of the outcome of the situation. In addition, the framework allows for analyzing the outcome of a sequence of variations upon a situation using the predictive algorithms. For example, in one embodiment, a predictive algorithm implementation examines relevant data from a software component development project and determines the likelihood of the project succeeding. An analysis may be performed upon the effects of timeline or pricing changes within a specified range.

A user that wishes to use this framework is only required to implement a Predictor class. In addition, the user may implement custom Situation, Prediction, and PredictorData classes if the simple ones provided by the framework are not desired. If the user wishes to use the analysis features of the framework, custom SituationGenerator and PredictionComparator classes will need to be implemented as well.

As shown in the class diagram of FIGS. 5A, 5B and 5C, to use this framework a Predictor class is implemented and provided. Situation, Prediction, PredictorData, SituationGenerator, and PredictionComparator objects are provided as described below, but also may be customized and used with the framework. For example, with respect to the software component development projects, custom Situations may be implemented to represent the state of a component competition, and custom Predictors implemented. In addition, a series of custom situation generators and prediction comparators may be produced to generate reporting information that will be used to advise administrators about the health of their ongoing competitions.

Predictor Objects. A Predictor interface permits training a predictive algorithm, initiating prediction of the outcome of a Situation, and for inspecting the capabilities of the implementation. This interface is a Java generic parameterized by the type of Situation and Prediction that the implementing class is designed for. In a preferred embodiment, Predictor classes need not be thread safe. Predictor implementations have a method that returns a Prediction for a given Situation.

In some embodiments, Predictor implementations provide a way to inspect the implementation's capabilities, for example, to determine which type of Situation object and Prediction object the Predictor works with; and whether the algorithm allows for full training, incremental training, both, or neither. It also may be possible to determine what additional custom capabilities the algorithm has, if any. Predictor implementations may be responsible for defining and registering such capabilities.

In some embodiments, Predictor implementations may facilitate training of the algorithm using actual or simulated data. There may be a full training, where the algorithm's training state is cleared and re-initialized with a set of training Situations, or incremental training, where the algorithm's state is refined with additional training Situations. Situation training sets can be very large, and therefore it is may not be possible to store them after training is complete. In some embodiments, well-behaved training algorithms therefore do not have references to the training set in their generated data.

A predictor may include a method that checks whether the predictor is "ready" to operate, for example, based on the training undertaken, or the availability of PredictorData. If the predictor is ready, then predictions may be made. Calling the predict method when a predictor is not ready preferably results in an error. A Situation Objects. Situation objects contain data to describe a situation to be predicted. They provide the input for a predictive algorithm. In a preferred embodiment, Situation objects are serializable, cloneable, and thread safe. Various implementations of the Situation interface may define how their data should be stored and accessed. This interface requires no method declarations.

Prediction Objects. Prediction objects contain the output data generated by a predictive algorithm, as well as references to the Situation and Predictor that generated them. In a preferred embodiment, Prediction objects are serializable, cloneable, and thread safe. A Prediction object may provide information about (and potentially access to) the Situation that it was generated from, as well as an indication of which Predictor class generated them. The Prediction therefore may permit a query about both the Situation object and the Predictor class.

PredictorData. Predictor algorithms will often need to store data that needs to be shared among instances of the same Predictor implementation, for example, data associated with the training of the algorithm. In a preferred embodiment, PredictorData instances are serializable, cloneable, and thread safe. The PredictorData interface defines how data is stored and accessed. It some implementations, lengthy operations such as predictor training are performed on a cloned copy of the predictor data object, which can then be substituted for the original.

PredictorDataRepository. Predictor instances use the PredictorData Repository to retrieve and manage their corresponding PredictorData objects. The PredictorDataRepository interface provides Predictor instances with synchronized access to PredictorData objects. Predictors may query the repository for the appropriate data object for their implementation. In addition, the interface may provide an atomic replacement operation for PredictorData instances, because Predictors may need to perform lengthy update operations during training. A Predictor may retrieve and update the correct PredictorData object for itself, for example by class name or some other key. In some implementations, there is a method to atomically replace predictor data objects, in order to allow length operations to performed without locking. For example, in order to avoid performance problems it is desirable to modify a clone of the original data object and use it to replace the original.

PredictorDataRepositoryManager. A PredictorDataRepositoryManager class manages a collection of PredictorData implementation instances from PredictorDataRepository, and provides synchronized access to them. For example, Predictor instances may use this class to obtain an instance of PredictorDataRepository to work with. PredictorDataRepositoryManager may provide singleton access to a PredictorDataRepository instance in use, where the type to instantiate may be configurable, and a simple implementation used in the absence of a configuration value.

Predictor Manager. This class provides means to instantiate the appropriate Predictor based on certain criteria. In some embodiments, a PredictorManager will try to find a good matching Predictor for a given pair of Situation and Prediction types, and if finer grained control is desired, the request may include defaults or specifically request a predictor by name.

In some embodiments, a Predictor may be created by providing a class name and by specifying the Situation and Prediction classes desired. The Predictors themselves should have no knowledge of this class: it is this class' responsibility to find the predictors. When a predictor is requested by class name, the class may be loaded if necessary, and an instance of it returned. In some embodiments, a predictor also may be requested by signature, and the Predictor Manger looks in the following places for the class until it finds it: (1) its own data structures, in case the appropriate class is already loaded and registered; (2) configuration, for an entry describing a specific predictor that matches the signature; (3) configuration, for an entry describing a package name to be searched for a Predictor implementation that complies to the signature; (4) A default, hardcoded package to be searched for the implementation. Since searching for a class can be time consuming, the PredictorManager may cache the results of any search so that future queries can obtain the right class to instantiate quickly.

In some cases, there may be more than one predictor that addresses the same Situation and Prediction pair. In this case, the method returns a configurable default. In the absence of a configuration value, the latest registered Predictor with that signature may be returned. In order for this feature to be useful, the user creates custom Situation and Prediction classes, even if they are trivial wrappers over the base implementations.

Analysis Framework. The analysis framework provides a framework to analyze the outcome of a sequence of variations upon a situation.

Situation Generator. SituationGenerator objects produce a sequence of Situations. For example, a SituationGenerator class may be instantiated with an initial Situation and a maximum value for one of the Situation's properties, and generate a sequence of Situations that covers the value range for that property from the initial value to the maximum.

Prediction Comparator. PredictionComparator objects compare two Predictions to determine which of their Situations is preferable. Some PredictionComparators may use a Prediction's context (Situation, Predictor) as part of the comparison criteria. For example, when comparing two Predictions A and B, if A is preferable to B then A is less than B. If the Comparator considers both Predictions to be equal, then A is equal to B. If the Comparator prefers B, then B is less than A. PredictionComparators therefore can be used to sort Predictions from most to least preferable.

Analyzer. Analyzers provide methods to explore a Predictor's outputs for variations of a given Situation. An Analyzer interface may provide a method to return all Predictions for a sequence of Situations, and/or a method to analyze a sequence of Situations and return the best one as defined by a given comparator.

Preferably, exception handling preferably is robust and well defined, and given the great amount of computation that may be necessary, the analyzer may be used in a multithreaded, clustered environment. In the interest of performance, each thread may have its own Predictor instance and therefore Predictor classes do not need to be made thread safe, but, in general, classes that are shared between Predictor objects are made thread safe.

Figure 7:
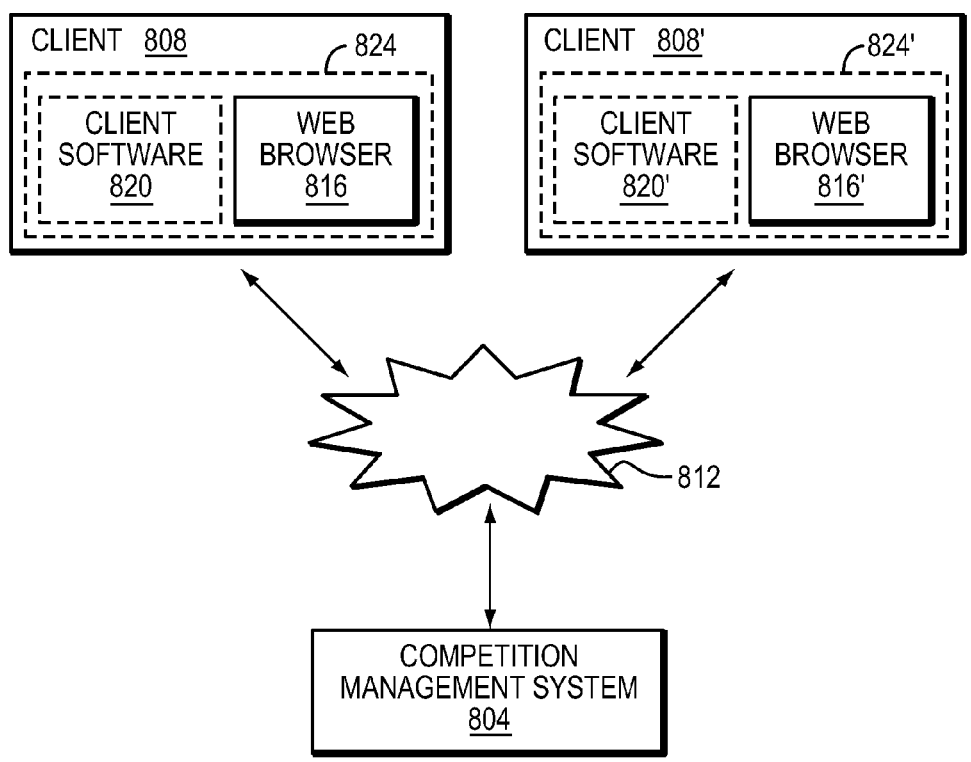
FIG. 7 is a block diagram of a competition management system server according to an embodiment of the invention.

Referring to FIG. 7, in one embodiment, a competition management system 801 includes at least one server 804, and at least one client 808, 808', generally 808. As shown, the distributed software development system includes two clients 808, 808', but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the OS X MACINTOSH operating system from Apple Computer of Cupertino, Calif., and various varieties of Unix, such as SUN SOLARIS from SUN MICROSYSTEMS, and GNU/Linux, for example, from RED HAT, INC. of Durham, N.C. (and others). The client 808 could also be implemented on such hardware as a smart or dumb terminal, network computer, wireless device, handheld device, wireless telephone, information appliance, workstation, minicomputer, mainframe computer, or other computing device, that is operated as a general purpose computer, or a special purpose hardware device used solely for serving as a client 808 to the competition management system.

Generally, in some embodiments, clients 808 can be operated and used by software developers to participate in various software development activities. Examples of software development activities include, but are not limited to software development projects, software design projects, testing software programs, creating and/or editing documentation, participating in programming contests, building applications, as well as others. Clients 808 can also be operated by entities who have requested that the software developers develop software (e.g., customers). The customers may use the clients 808 to review software developed by the software developers, post specifications for the development of software programs, test software modules, view information about the developers, as well as other activities described herein. The clients 808 may also be operated by a facilitator, acting as an intermediary between the customers and the software developers.

In various embodiments, the client computer 808 includes a web browser 816, client software 820, or both. The web browser 816 allows the client 808 to request a web page or other downloadable program, applet, or document (e.g., from the server 804) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 808 manually requests a web page from the server 804. Alternatively, the client 808 automatically makes requests with the web browser 816. Examples of commercially available web browser software 816 are INTERNET EXPLORER, offered by Microsoft Corporation, Safari offered by APPLE, or FIREFOX offered by the Mozilla Foundation.

In some embodiments, the client 808 also includes client software 820. The client software 820 provides functionality to the client 808 that allows an individual to participate, supervise, facilitate, or observe development activities described above. The software 820 may be implemented in various forms, for example, it may be in the form of a Java applet that is downloaded to the client 808 and runs in conjunction with the web browser 816, or the client software 820 may be in the form of a standalone application, implemented in a multi-platform language such as Java or in native processor executable code. The software 820 may be in the form of widgets, as described above. In one embodiment, if executing on the client 808, the client software 820 opens a network connection to the server 804 over the communications network 812 and communicates via that connection to the server 804. The client software 820 and the web browser 816 may be part of a single client-server interface 824; for example, the client software can be implemented as a "plug-in" to the web browser 816.

A communications network 812 connects the client 808 with the server 804. The communication may take place via any media or any combination of media such as standard telephone lines, LAN or WAN links (e.g., T1, T3, 56 kb, X.25), broadband connections (ISDN, Frame Relay, ATM), wireless links (802.11, bluetooth, etc.), and so on. Preferably, the network 812 can carry TCP/IP protocol communications, and HTTP/HTTPS requests made by the web browser 816 and the connection between the client software 820 and the server 804 can be communicated over such TCP/IP networks. The type of network is not a limitation, however, and any suitable network may be used. Non-limiting examples of networks that can serve as or be part of the communications network 812 include a wireless or wired ethernet-based intranet, a local or wide-area network (LAN or WAN), and/or the global communications network known as the Internet, which may accommodate many different communications media and protocols.

The competition management system servers 804 interact with clients 808. The server 804 is preferably implemented on one or more server class computers that have sufficient memory, data storage, and processing power and that run a server class operating system (e.g., SUN Solaris, GNU/Linux, and the MICROSOFT WINDOWS family of operating systems). The servers may be available on a cloud computing system. Other types of system hardware and software than that described herein may also be used, depending on the capacity of the device and the number of users and the size of the user base. For example, the server 804 may be or may be part of a logical group of one or more servers such as a server farm or server network. As another example, there could be multiple servers 804 that may be associated or connected with each other, or multiple servers could operate independently, but with shared data. In a further embodiment and as is typical in large-scale systems, application software could be implemented in components, with different components running on different server computers, on the same server, or some combination.

In one embodiment, the server 804 and clients 808 enable the distributed software and graphics design development and/or assembly by one or more individuals, which individuals may or may not be associated with a particular entity requesting the development of the software program. A software program can be any sort of instructions for a machine, including, for example, without limitation, a component, a class, a library, an application, an applet, a script, a logic table, a data block, a widget, a user interface element, or any combination or collection of one or more of any one or more of these.

In one embodiment, the software program is a software component. Generally, a software component is a functional software module that may be a reusable building block of an application. A component can have any function or functionality. Just as a few examples, software components may include, but are not limited to, such components as graphical user interface tools, a small interest calculator, an interface to a database manager, calculations for actuarial tables, a DNA search function, an interface to a manufacturing numerical control machine for the purpose of machining manufactured parts, a public/private key encryption algorithm, and functions for login and communication with a host application (e.g., insurance adjustment and point of sale (POS) product tracking). In some embodiments, components communicate with each other for needed services (e.g., over the communications network 812). A specific example of a component is a JavaBean, which is a component written in the Java programming language. A component can also be written in any other language, including without limitation Visual Basic, C++, Java, and C#.

In one embodiment, the software program is an application. The application may be comprised of one or more software components. In one embodiment, the software application is comprised of software components previously developed using the methods described herein. In some embodiments, the application comprises entirely new software programs. In some embodiments, the application comprises a combination of new software programs and previously developed software programs.

The competition management system allows for the holding of competitions among a diverse group of competitors, and the interaction of customers, competitors, and deliverable managers, among others, as described herein.

Figure 8:
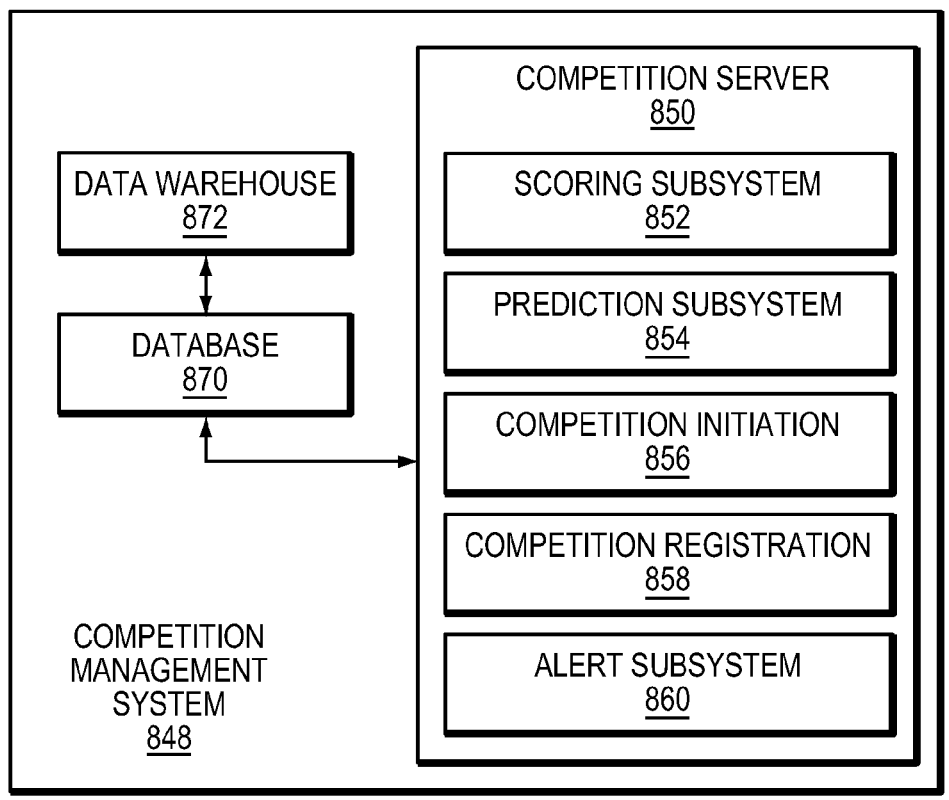
FIG. 8 is a block diagram of a competition management system according to an embodiment of the invention.

Referring to FIG. 8, in some embodiments, a system for developing an asset by competition, such as a competition management system 850, for example as described above (e.g., as 804 in FIG. 7), includes a scoring subsystem 852 that may be used to specify minimum standards for an asset. This may include specifying a scorecard. This may include specifying a minimum score for the asset using the scorecard. The scorecard may be scored by peers, customers, or by any other type of review. Any suitable scoring system may be used, with the caveat that it is important that to be able to determine the quality of the asset in order to predict the combination of competitors that are desired to reach that level of quality. The scoring subsystem 852 also may be used to rate and rank the competitors, for example to determine reliability and skill metrics as described above. These metrics may then be used by the prediction subsystem 854.

A prediction subsystem 854 determines whether a competition is likely to succeed, for example, whether there is a sufficient likelihood that the asset development competition will result in an asset that meets the minimum standards based on historical information about the performance of contestants. The prediction subsystem may determine, given a type of competition and/or certain information about the competition, the competition parameters that will result in a likelihood of success. In some embodiments, the prediction subsystem 854 uses the prediction framework described herein. A competition initiation subsystem 856 may be used to initiate an on-line competition using a competition server using the parameters determined by the prediction subsystem 854.

In some embodiments, an on-line competition registration system 858 receives from potential contestants indicia of interest in participating in an asset development competition. Any suitable registration system may be used that incorporates the features described. The prediction subsystem 854 determines an estimated likelihood that the asset development competition will result in an asset that meets the minimum standards based on historical information about the performance of the contestants from whom the indicia of interest were received. The registration system 858 may be configured to automatically close registration for the competition if the likelihood of an asset that meets the minimum standards is greater than a threshold value. This threshold value may be tuned for the particular type of competition, but, for example, a 99% likelihood, a 97% likelihood and 95% likelihood may be suitable parameters.

In some embodiments, the registration system automatically increases incentives if the likelihood of an asset that meets the minimum standards is less than a threshold value at a predetermined time (e.g., a period of time after opening of registration). In some embodiments, an alert subsystem 860 signals to a competition administrator (e.g., customer, competition management system administrator) that incentives should be increased if the likelihood of an asset that meets the minimum standards is less than a threshold value at a specified time. The alert subsystem may provide the administrator with information and/or suggestions about which competition parameters may modified (e.g., increase prize, increased time, additional prize, etc.) in order to achieve the desired likelihood of success.

It should be understood that there may be additional features of a competition management system such as those used commercially. For example, these subsystems may communicate with a database 870, which may be any suitable commercial-grade database. In some embodiments, a data warehouse 872 may be used to store competition registration and completion data, for access and analysis by the prediction subsystem.

General Applicability

Although described here with reference to software, and useful when implemented with regard to software assets, the cooperatively developed product can be any sort of tangible or intangible object that embodies intellectual property. As non-limiting examples, the techniques could be used for computer hardware and electronics designs, or other designs such as architecture, construction, or landscape design. Other non-limiting examples for which the techniques could be used include the development of all kinds of written documents and content such as documentation and articles for papers or periodicals (whether on-line or on paper), research papers, scripts, multimedia content, legal documents, and more.

APPENDIX

Framework Technical Documentation Excerpt

Overview

Figure 6A:
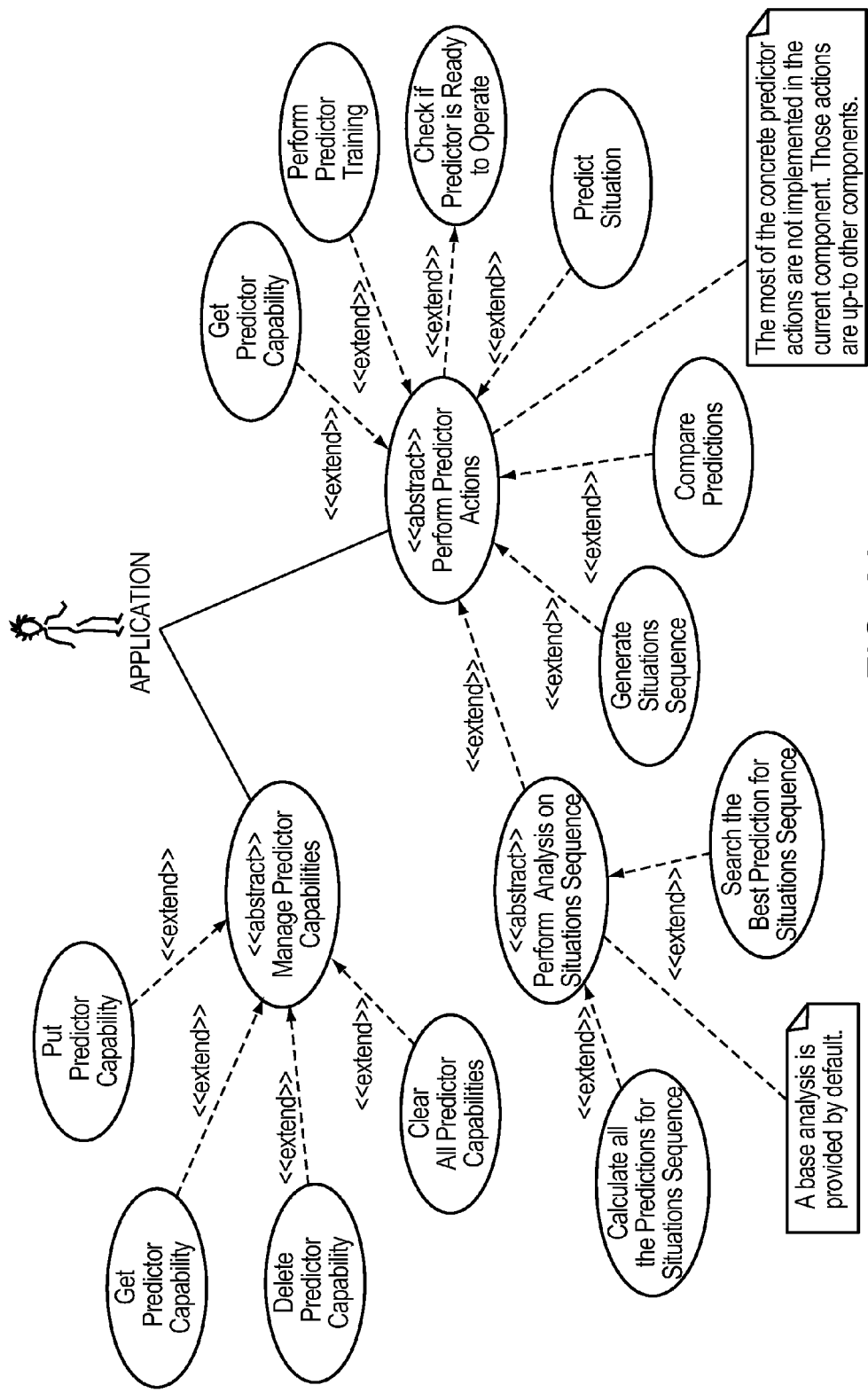
FIGS. 6A, 6B and 6C collectively illustrate a use case diagram illustrating by example an embodiment of a prediction framework.
Figure 6B:
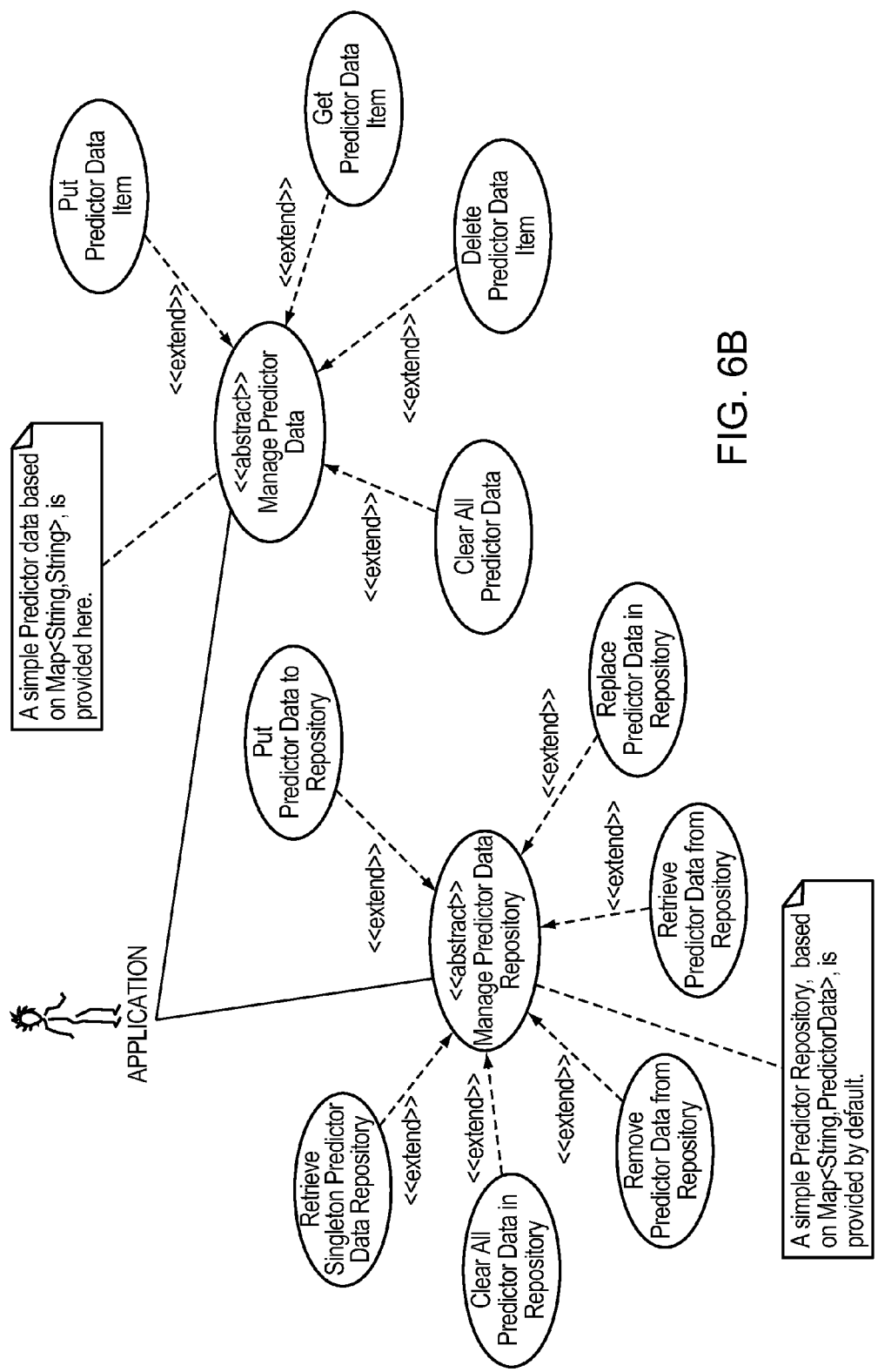
Figure 6C:
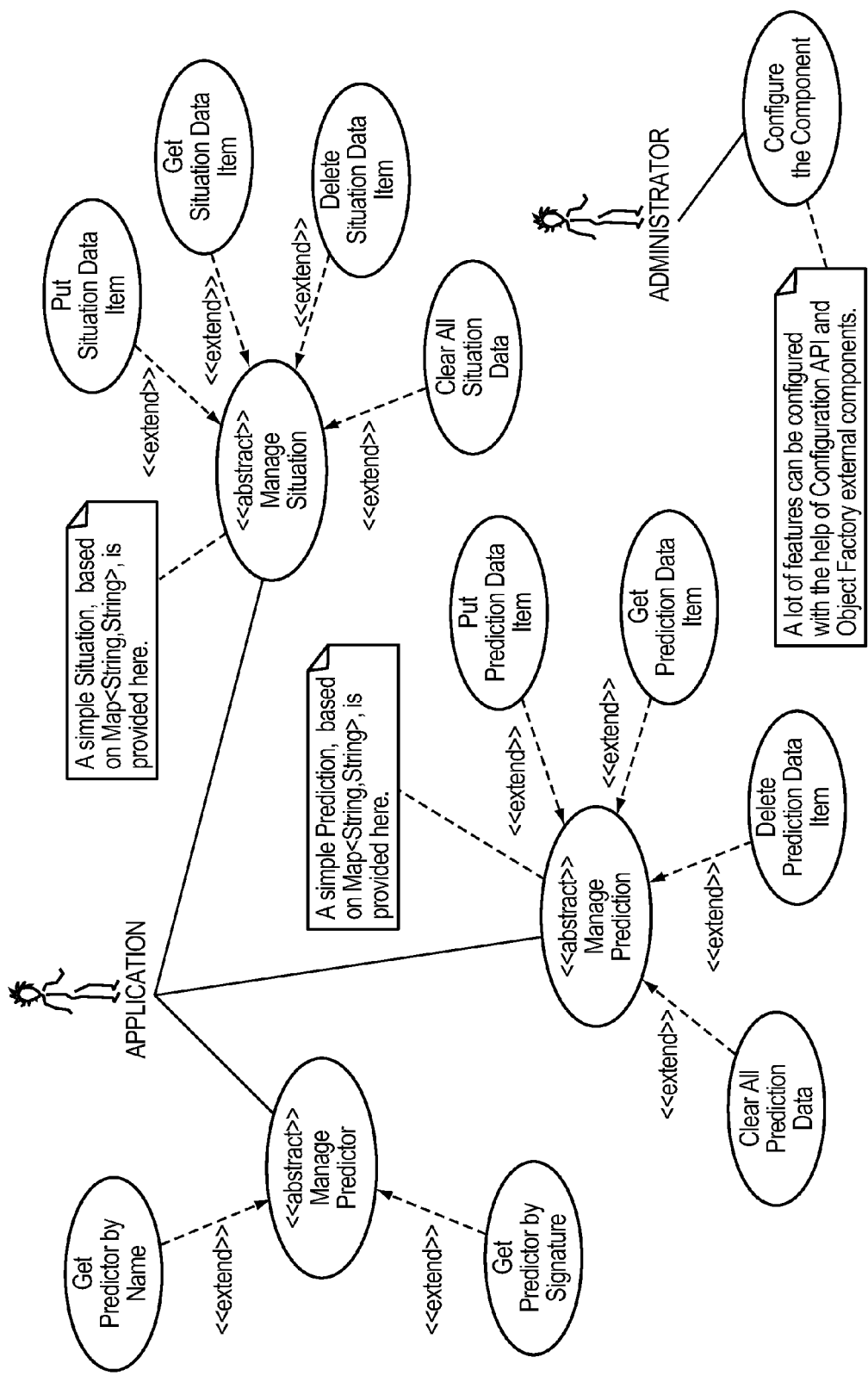

This excerpt from the technical specification documentation is intended to provide further details, by way of example, about one embodiment of a framework as described herein. It should be understood that requirements described herein may be requirements for this particular implementation, and not for all implementations. Please also refer to the class diagram (FIGS. 5A, 5B and 5C) and the use case diagram (FIGS. 6A, 6B and 6C) for further information.

Design Patterns

Strategy pattern is widely used in this component. We can say that ALL interfaces define pluggable strategies; some of them have the concrete strategies (SimpleSituation, SimplePrediction, SimplePredictorData, SimplePredictorDataRepository, SimpleAnalyzer). The containers will be in the user code, which will use our component.

The exact Strategy pattern examples are:

PredictorDataRepositoryManager (container), PredictorDataRepository (pluggable strategy), SimplePredictorDataRepository (concrete strategy).

SimpleAnalyzer (container), Predictor (pluggable strategy), concrete Predictor implementations (concrete strategy) to be implemented in the external code.

The PredictorDataRepositoryManager and PredictorManager classes can not be instantiated, have only static methods, and can not be inherited—so they act like Singleton pattern. Of course, this is not an exact Singleton pattern implementation, but the reason and behavior of those classes are very similar to be mentioned here.

The cloning feature and common abstract BaseAttributes class provides an ability to use SimpleSituation, SimplePrediction, SimplePredictorData like Prototype pattern. So, the user will have an ability to make cloned copies of those classes and slightly modify them—it can be useful even in SituationGenerator implementations, or for some general purposes: to simplify making similar predictions, situations, and predictor data objects.

Iterator pattern is defined in the SituationGenerator interface (which is Iterable) and may be implemented in the concrete classes implementing SituationGenerator interface.

Required Algorithms

Configuring Predictor Data Repository Manager

This algorithm relates to the configure(configuration) method of the PredictorDataRepositoryManager class. The next actions are needed.

1. If (configuration==null), then simply use the default repository:
    PredictorDataRepositoryManager.repository=new
        SimplePredictorDataRepository( );
    return;

2. Retrieve the repository key:
   String repositoryKey=(String) configuration.getPropertyValue("repositoryKey");
3. If (repositoryKey==null), then simply use the default repository:
   PredictorDataRepositoryManager.repository=new SimplePredictorDataRepository( );
   return;
4. Retrieve the object factory specification:
   ConfigurationObject objFactSpec=configuration.getChild("objFactSpec");
5. If (objFactSpec==null), the use Reflection to make the repository:
   PredictorDataRepositoryManager.repository=Class<PredictorDataRepository>.forName(repositoryKey)
   ).newInstance( );
   If Reflection-based approach not failed, then return;
6. Else, use the Object Factory to instantiate (and may be to configure) the repository. The next actions are needed:
   6.1. Create a specification factory:
      ConfigurationObjectSpecificationFactory configSpec=new ConfigurationObjectSpecificationFactory(objFactSpec);
   6.2. Create an instance of the object factory:
      ObjectFactory objectFactory=new ObjectFactory(configSpec);
   6.3. Make the concrete repository by Object Factory:
      PredictorDataRepositoryManager.repository=(PredictorDataRepository)
      objectFactory.createObject(repositoryKey);
7. If Object Factory-based approach not failed, then return;
8. Else, simply use the default repository:
   PredictorDataRepositoryManager.repository=new SimplePredictorDataRepository( );
   return;

Configuring Predictor Manager

This algorithm relates to the configure(configuration) method of the PredictorManager class. The next actions are needed.
1. Set the configuration to internal field:
   PredictorManager.configuration=configuration;
2. Retrieve the object factory specification:
   ConfigurationObject objFactSpec=configuration.getChild("objFactSpec");
3. If (objFactSpec==null) then we will use the Reflection in the future, so set the related internal field to null:
   PredictorManager.objectFactory=null;
4. Else, do the next actions for preparing the object for the future usage. The next actions are needed:
   4.1. Create a specification factory:
      ConfigurationObjectSpecificationFactory configSpec=new ConfigurationObjectSpecificationFactory(objFactSpec);
   4.2. Create an instance of the object factory:
      PredictorManager.objectFactory=new ObjectFactory(configSpec);

Retrieving Predictor by Name

This algorithm relates to the getPredictorByName(predictorName) method of the PredictorManager class. The next actions are needed:

1. Try to get the Predictor instance from the cache:
   Predictor<Situation,Prediction> predictor=PredictorManager.predictorInstanceCache.get(predictorName);
2. If (predictor !=null), then return the cached instance:
   return predictor;
3. If PredictorManager.objectFactory !=null, then make the predictor by the Object Factory and return it:
   predictor=(Predictor<Situation,Prediction>) PredictorManager.objectFactory.createObject(predictorName);
4. If predictor !=null, then:
   PredictorManager.predictorinstanceCache.put(predictorName, predictor);
   return predictor;
5. Else, make the predictor by the Reflection and return it:
   predictor=Class<Predictor<Situation, Prediction>>.forName(predictorName).newInstance( );
   PredictorManager.predictorinstanceCache.put(predictorName, predictor);
   return predictor;

Retrieving Predictor by Signature

This algorithm relates to the getPredictorBySignature(situationName, predictionName) method of the PredictorManager class. The next actions are needed:
1. Prepare the local variable for searching predictor class name of package name:
   String predictorClassName=null;
   String predictorPackageName=null;
2. Make the predictor signature:
   PredictorSignature signature=new PredictorSignature( );
   signature.setSituationName(situationName);
   signature.setPredictionName(predictionName);
3. Try to get the cached class name of the predictors:
   String cachedPredictorClassName=this.predictorNamesCache.get(signature);
4. If (cachedPredictorClassName !=null) then we get the exact cached class name:
   predictorClassName=cachedPredictorClassName;
5. Else, we have to find the predictor class name or predictor package name. The next actions are needed:
   5.1. Retrieve the configuration object for the signature:
      ConfigurationObject predictorConfig=PredictorManager.configuration.getChild(situationName).getChild(predictionName);
   5.2. If (predictorConfig==null), then use the default package and end searching:
      predictorPackageName=PredictorManager.PREDICTOR_DEFAULT_PACKAGE; go to step 6.
   5.3. Retrieve the (optionally null) class name and package name for predictor signature:
      predictorClassName=(String) predictorConfig.getPropertyValue("predictorName");
      predictorPackageName=(String) predictorConfig.getPropertyValue("predictorPackage");
   5.4. If both predictorClassName and predictorPackageName are null, then use the default package:
      predictorPackageName=PredictorManager. PREDICTOR_DEFAULT_PACKAGE;
   5.5. Retrieve the class name for resolving duplicates (optionally null):
      String defaultPredictorForDuplicates=(String) predictorConfig.getPropertyValue("defaultPredictorForDuplicates");

6. If (predictorClassName !=null) then make the predictor. The next actions are needed:
   6.1. Get the predictor instance:
      Predictor<Situation,Prediction> predictor=PredictorManager.getPredictorByName(predictorClassName);
   6.2. Return the prepared predictor:
      return predictor;
7. Else, we may retrieve the predictor from the package. The next actions are needed:
   7.1. Retrieve all the class names from the package:
      List<String> classes=PredictorManager.findClassNamesInPackage(predictorPackageName);
   7.2. Make the list of the to predictors to be found:
      List<Predictor> foundPredictors=new ArrayList<Predictor>( );
   7.3. For each class:String from classes list do the next actions:
      7.3.1. Get the predictor instance:
         Predictor<Situation,Prediction> predictor=PredictorManager.getPredictorByName(class);
      7.3.2. If (predictor !=null) and predictor.getSituationName( ) equals to situationName and
         predictor.getPredictionName( ) equals to predictionName, then add predictor to the list of found predictors:
         foundPredictors.add(predictor);
      7.3.3. If size of foundPredictors list >=2, and defaultPredictorForDuplicates is not null, then return the default predictor:
         Predictor<Situation,Prediction> predictor=PredictorManager.getPredictorByName(defaultPredictorForDuplicates);
         return predictor;
   7.4. If foundPredictors.size( )==0, then return null;
   7.5. Else, return the last created predictor:
      return foundPredictors.get(foundPredictors.size( )-1);

Finding Classes in the Package

This algorithm relates to findClassNamesInPackage(packageName) method of the PredictorManager class. Please refer to the article on the link below: http://www.javaworld.com/javaworld/javatips/jw-javatip113.html Please note, we may support both packages placed in the regular file system, and from the JAR file. The link to source code is: http://www.javaworld.com/javatips/javatip113/Tip113.zip (the algorithm is in RTSI.find(String, Class) method). The high level explanation of the algorithm is below:

1. Replace '.' characters by '/' character in the package name. Optionally add the prefix '/' character to the package name.
2. Make the URL from the package name.
3. Make the output list:
   List<String> outputList=new ArrayList<String>( );
4. If made URL is null, then return empty list:
   return outputList;
5. Get the file directory for the URL.
6. If directory is present, then we may get the classes from package located on the file system. The next actions are needed:
   6.1. Retrieve all the files from the directory.
   6.2. For each file:String from found files in the directory—do the next actions:
      6.2.1. If file ends with ".class", then:
         remove that ".class" suffix;
         add the remaining string to the outputList.
7. Else, it means the package may be inside JAR file. The next actions are needed:
   7.1. Make the connection to JAR file.
   7.2. Get the entry name from the JAR file. Let's call it startData:String.
   7.3. Get the JarFile.
   7.4. Get the JarFile entries.
   7.5. For each entry in JarFile do the next actions:
      7.5.1. Get the entry name.
      7.5.2. If name ends with ".class" and starts from the startData, then remove the ".class" suffix and any prefixes (with the last "/" delimiter).
      7.5.3. Add the remaining string to the outputList.
8. Return the list of found classes:
   return outputList;

Simple Analyzing of Situations

This algorithm relates to the analyze(generator) method of the SimpleAnalyzer<T:Predictor<S:Situation,P:Prediction>> class. The next actions are needed.

1. Retrieve the iterator:
   Iterator<S> iterator=generator.iterator( );
2. Prepare an empty list for the resulted predictions:
   List<P> outputList=new ArrayList<P>( );
3. Process all the situations from the generator iterator. while(iterator.hasNext( ))—do the next actions:
   3.1. Retrieve the next situation:
      S situation=iterator.next( );
   3.2. Calculate the prediction for the situation:
      P prediction=this.getPredictor( ).predict(situation);
   3.3. Put the prediction to the output list:
      outputList.add(prediction);
4. Return the list of the predictions:
   return outputList;

Analyzing of Situations by Using Prediction Comparator

This algorithm relates to the analyze(generator, comparator) method of the SimpleAnalyzer<T:Predictor<S:Situation, P:Prediction>> class. The next actions are needed.

1. Generate the list of situations and the related predictions:
   List<P> predictions=this.analyze(generator);
2. Prepare the empty output result:
   P bestPrediction=null;
3. Find the best prediction by looking through the list of predictions:
   for each prediction:P from predictions list do the next actions:
      3.1. If (bestPrediction==null) then simply set the current prediction to the bestPrediction variable (it will only happen on the first element of the predictions list):
         bestPrediction=prediction;
         continue;
      3.2. If (comparator.compare(prediction, bestPrediction) <0) then replace the bestPrediction by the prediction instance (it means the prediction is less (more preferable) than the bestPrediction):
         bestPrediction=prediction;
         continue;
4. Return the best found prediction:
   return bestPrediction;

Component Class Overview
    com.topcoder.predictor Package
    PredictorManager:
    PredictorManager provides methods to create the right kind of Predictor given certain criteria. It is possible to create Predictors by class name and by specifying the Situation and Prediction classes desired.
    The predictors themselves have no knowledge of this class: it is this class' responsibility to find the predictors. When a predictor is requested by class name, the class is loaded if necessary and an instance of it will be returned. When a predictor is requested by signature, the component looks in the following places for the class (once the class is found, the component does not need to keep looking):
      1) Its own data structures, in case the appropriate class is already loaded and registered.
      2) Configuration, for an entry describing a specific predictor that matches the signature.
      3) Configuration, for an entry describing a package name to be searched for a Predictor implementation that complies with the signature.
      4) A default, hardcoded package to be searched for the implementation.
    Since searching for a class can be time consuming, the component caches the results of any search so that future queries can obtain the right class to instantiate quickly.
    The configurable way is provided to specify the default implementation for a signature if more than once matching Predictor is found. The latest found Predictor will be picked if no default is configured.
    The manager will try to find a good matching algorithm for a pair of situation and prediction types. If finer grained control is desired, the user may elect to set defaults or to specifically get a predictor by name.
    Predictor<S:Situation,P:Prediction> (interface):
    Predictors are algorithms that predict the outcome of a Situation. The Predictor interface provides the following methods:
      A means to determine the capabilities of the Predictor. This includes determining which Situation and Prediction types the Predictor uses, whether the algorithm supports training, and whether the algorithm supports incremental training. In addition, it is possible for Predictor implementations to define their own custom capabilities, which can be queried through the interface.
      A means to train the algorithm both fully and incrementally (provided that these operations are supported).
      A predict method.
      A method that checks whether the predictor is "ready" to operate. It is up to each predictor to implement this in a way that makes sense to the implementation, but essentially if the predictor is ready then predictions can be made. Calling the predict method when the predictor is not ready is an error. An example of a situation when a predictor isn't ready is if the required PredictorData isn't available, for example before or during initial training.
    In addition, to permit inspection of capabilities by the PredictorManager, Predictor implementing classes may provide a default constructor.
    Situation (interface): A Situation contains the input for a Predictor. The purpose of this interface is to form the apex of the Situation hierarchy, and to provide users with a way to create custom Situation classes that don't share behavior with SimpleSituation.
    All Situation implementations may be Serializable and Cloneable.

Prediction (interface): A Prediction contains the output of a Predictor. The purpose of this interface is to form the apex of the Prediction hierarchy, and to provide users with a way to create custom Situation classes that don't inherit from SimplePrediction.
    It is important for the user of a Prediction to be able to determine in which context the Prediction was issued. For this purpose, the Prediction interface contains a way to query both the Situation object and the Predictor class that generated a given Prediction object.
    All Prediction implementations may be Serializable, Cloneable.
    BaseAttributes (abstract class): This is simple class, providing the general actions on the string-based attributes. This is just a simple synchronized wrapper over the Map<String, String> dictionary. There are several easy-to-use methods for working with attributes, a clone, equals, hashCode and toString features. This class is serializable.
    SimpleSituation: Simple Situation implementation as a dictionary of strings. This can be used as-is or as a parent class for more complex Situations. This class provides CRUD methods for the Situation's data. This is a child of the BaseAttributes, which provides the actual operations with attributes.
    SimplePrediction: Simple Prediction implementation as a dictionary of strings. This can be used as-is or as a parent class for more complex Predictions. This class provides CRUD methods for the Prediction's data. This is a child of the BaseAttributes, which provides the actual operations with attributes. Just getter/setter methods for situation and predictor; and clone/equals/hashCode/toString are additional methods.
    PredictorSignature: A simple container class for storing information about situation class name and prediction class name. This is a simple java bean class, supporting equals and hashCode functionality.
    com.topcoder.predictor.data Package
    PredictorDataRepository (interface): A predictor data repository manages a collection of PredictorData implementation instances, and provides synchronized access to them. A Predictor is able to retrieve and update the correct predictor data object for itself, for example by class name or some other key. There is a way to atomically replace predictor data objects, in order to allow lengthy operations to be performed without locking.
    SimplePredictorDataRepository: This is a simple, synchronized-dictionary-driven implementation of the predictor data repository. This can be used as-is or as a parent class for more complex PredictorDataRepository implementations. This class provides CRUD methods for the PredictorData instances. So, the keys—are strings (like class name of the Predictor), and values—are related PredictorData instances.
    PredictorData (interface): A PredictorData object contains data that needs to be shared between instances of a Predictor implementation.
    The purpose of this interface is to form the apex of the PredictorData hierarchy, and to provide users with a way to create custom PredictorData classes that don't inherit from SimplePredictorData.
    All PredictorData implementations may be Serializable and Cloneable.
    SimplePredictorData: Simple PredictorData implementation as a dictionary of strings. This can be used as-is or as a parent class for more complex PredictorData implementations. This class provides CRUD methods for the Predictor data. This is a child of the BaseAttributes, which provides the actual operations with attributes.

PredictorDataRepositoryManager: Manages an PredictorDataRepository singleton of configurable type. If left not configured, it'll use a SimplePredictorDataRepository by default. This class provides a method to access the singleton instance of PredictorDataRepository. Predictors may use this class to get an instance of PredictorDataRepository to work with.

com.topcoder.predictor.analysis Package

SituationGenerator<S:Situation> (interface): SituationGenerator objects produce a sequence of Situations. For example, a SituationGenerator class could be instantiated with an initial Situation and a maximum value for one of the Situation's properties, and generate a sequence of Situations that covers the value range for that property from the initial value to the maximum. All SituationGenerator implementing classes must extend this interface and be Serializable.

PredictionComparator<P:Prediction> (interface): PredictionComparator objects compare two Predictions to determine which of their Situations is preferable. Some PredictionComparators may use a Prediction's context (Situation, Predictor) as part of the comparison criteria.

When comparing two Predictions A and B, if A is preferable to B then A is less than B. If the Comparator considers both Predictions to be equal, then A is equal to B. If the Comparator prefers B, then B is less than A. PredictionComparators therefore can be used to sort Predictions from most to least preferable.

All PredictionComparator classes must extend this interface. Also, all PredictionComparators must be Serializable.

Analyzer<T:Predictor<S:Situation,P:Prediction>> (interface): Analyzers provide methods to explore a Predictor's outputs for variations of a given Situation. The Analyzer interface provides a method to return all Predictions for a sequence of Situations, and a method to analyze a sequence of Situations and return the best one as defined by a given comparator.

SimpleAnalyzer<T:Predictor<S:Situation,P:Prediction>>: This class provides a simple implementation for the Analyzer interface. It implements a method to return all Predictions for a sequence of Situations, and a method to analyze a sequence of Situations and return the best one as defined by a given comparator.

Component Exception Definitions
System Exceptions

IllegalArgumentException: This exception can be thrown by classes of this component when the argument of method is null, empty string, or has a wrong value. If the argument can contain a null value, then it will be specially described on the method documentation.

IllegalStateException: This exception can be thrown if the internal state of the class is not ready to perform the requested action. For example, Predictor interface has several methods (predict, performFullTraining, performIncrementalTraining), which can be called only after special preparation (or may be can called only until the predictor becomes fully trained, etc.). So, if some of those methods were called in improper moment, then this exception will be thrown.

Custom Exceptions

PredictorFrameworkException: A common parent custom exception for this component. It can help if a new exception added later to the component. The code that catches the common parent exception will still be good. All the other custom exceptions of this component may inherit from this one. It can be thrown in any general problems in the predictor framework. It is not needed to throw this exception in the current version, because there are the other concrete exceptions for all the situations. But this exception can be freely thrown in next version (or now too)—in some non-usual situations.

PredictorManagementException: A common parent custom exception for the PredictorManager class. It can help if a new exception added later to that class. The code that catches the common parent exception will still be good. It can be thrown in any general problems when managing the predictor. This exception can be also used to wrap exceptions from external components.

ConfigurationException: This exception is used to signal configuration related problems.

It is used to wrap any exceptions related to the configuration data or that indicate a problem with the configuration file: configuration API exceptions indicating bad or missing file, incorrect properties or missed required properties, and Object Factory exceptions as well.

PredictorException: A common parent custom exception for the Predictor interface. It can help if a new exception added later to that interface or concrete implementation of that interface. The code that catches the common parent exception will still be good. It can be thrown in any general problems when working with predictor. This exception can be also used to wrap exceptions from external components.

IllegalOperationException: The exception for reporting situation with a wrong call to the method. It can be thrown if the user has called the method, which is not supported in the current class (like not implemented).

SituationException: A common parent custom exception for the Situation interface. It can help if a new exception added later to that interface or concrete implementation of that interface. The code that catches the common parent exception will still be good. It can be thrown in any general problems when working with situation. This exception can be also used to wrap exceptions from external components.

PredictionException: A common parent custom exception for the Prediction interface. It can help if a new exception added later to that interface or concrete implementation of that interface. The code that catches the common parent exception will still be good. It can be thrown in any general problems when working with prediction. This exception can be also used to wrap exceptions from external components.

PredictorDataRepositoryManagementException: A common parent custom exception for the PredictorDataRepositoryManager class. It can help if a new exception added later to that class. The code that catches the common parent exception will still be good. It can be thrown in any general problems when managing the predictor data repository. This exception can be also used to wrap exceptions from external components.

PredictorDataRepositoryException: A common parent custom exception for the PredictorDataRepository interface. It can help if a new exception added later to that interface or concrete implementation of that interface. The code that catches the common parent exception will still be good. It can be thrown in any general problems when working with predictor data repository. This exception can be also used to wrap exceptions from external components.

PredictorDataException: A common parent custom exception for the PredictorData interface. It can help if a new exception added later to that interface or concrete implementation of that interface. The code that catches the common parent exception will still be good. It can be thrown in any general problems when working with predictor data. This exception can be also used to wrap exceptions from external components.

AnalyzerException: A common parent custom exception for the Analyzer interface. It can help if a new exception added later to that interface or concrete implementation of that interface. The code that catches the common parent exception will still be good. It can be thrown in any general problems when analyzing the situations. This exception can be also used to wrap exceptions from external components.

SituationGeneratorException: A common parent custom exception for the SituationGenerator interface. It can help if a new exception added later to that interface or concrete implementation of that interface. The code that catches the common parent exception will still be good. It can be thrown in any general problems when generating situations. This exception may be also used to wrap exceptions from external components.

PredictionComparatorException: A common parent custom exception for the PredictionComparator interface. It can help if a new exception added later to that interface or concrete implementation of that interface. The code that catches the common parent exception will still be good. It can be thrown in any general problems when comparing the predictions. This exception can be also used to wrap exceptions from external components.

TrainingException: The exceptions for reporting problems with training algorithm. It can be thrown if some error has occurred during training of the predictor.

Thread Safety

The framework is intended to be used in a multithreaded, clustered environment. In general, any class that needs to be shared between Predictor objects needs to be made thread safe. In the interest of performance, each thread may possess its own Predictor instance and therefore Predictor classes do not need to be made thread safe. The PredictorDataRepositoryManager and PredictorManager classes may use locking on the lockObject static field to access any mutable content. The synchronized wrappers against dictionaries may be used in several classes to ensure thread-safe access to those internal maps. And the locking on "this" reference may be used when accessing other (and also mutable) internal fields to ensure thread safety. PredictorSignature is like a class for only internal usage, so it does not need to be thread-safe. It will be used inside this component only in the thread-safe manner. The framework therefore may be thread-safe for the most real applications, EXCEPT the Predictor interface. It is assumed that each thread will use its own instance of the Predictor implementation.

Base Software Components

The framework may use commercially available base components, such as the following components available from TOPCODER, INC. of Glastonbury, Conn.

Base Exception 2.0—is used as a base for all custom exceptions.

Configuration API 1.0—allows getting configuration data from the named user provided objects. This API decouples loading of setup properties from the using of them.

Object Factory 2.0.1—is used to create pluggable concrete implementation of the pluggable classes.

Object Factory Configuration API Plugin 1.0—provides a generic infrastructure for dynamic object creation at runtime. It provides a standard interface to create objects based on some specifications. This component provides one such specification using the ConfigurationObject interface from the Configuration API component. This component provides an implementation of the SpecificationFactory interface from Object Factory component and uses ConfigurationObject to supply the specifications.

Packages

The framework may be divided into 4 packages:

(1) common predictor framework. com.topcoder.predictor—the package with predictor manager and predictor related interfaces, classes and custom exceptions.

(2) concrete predictors, which are the pluggable classes to be provided by the user. com.topcoder.predictor.impl—contains the concrete implementations of the Predictor<S:Situation,P:Prediction> interface.

(3) data storage of the predictor information. com.topcoder.predictor.data—the package with predictor data repository and its manager. Several custom exceptions are also defined there.

(4) analysis framework. com.topcoder.predictor.analysis—the package with interfaces/classes for more complex analysis—like situations variation analysis, using comparators, etc. Several custom exceptions are also defined there.

To Use the Framework

Typically, a Predictor<S:Situation,P:Prediction> interface concrete implementation is defined to work with this framework. Implementations of the SituationGenerator<S:Situation> and PredictionComparator<P:Prediction> interfaces may be provided by a user in order to use the analysis part of the framework.

EXAMPLES

Making the Custom Predictor Class

A user of the framework can provide an implementation of the Predictor interface. An exemplary possible implementation is shown below.

```
package com.topcoder.predictor.impl;
import java.util.List;
import java.util.Set;
import com.topcoder.predictor.Predictor;
import com.topcoder.predictor.PredictorException;
import com.topcoder.predictor.SimplePrediction;
import com.topcoder.predictor.SimpleSituation;
public class PredictorA implements Predictor<SimpleSituation,
SimplePrediction> {
    /**
     * <p>
     * Does nothing.
     * </p>
     */
    public void clearCapabilities( ) {
    }
    /**
     * <p>
     * Returns null.
     * </p>
     *
     * @param key
     *            the key of the custom capability to be retrieved.
     * @return null
     */
    public String getCapability(String key) {
        return null;
    }
    /**
     * <p>
     * Returns null.
     * </p>
     *
     * @return null
     */
    public Set<String> getCapabilityKeys( ) {
        return null;
    }
    /**
     * <p>
```

```
 * Returns PA.
 * </p>
 *
 * @return PA
 */
public String getPredictionName( ) {
    return "PA";
}
/**
 * <p>
 * Returns SA.
 * </p>
 *
 * @return SA
 */
public String getSituationName( ) {
    return "SA";
}
/**
 * <p>
 * Returns false.
 * </p>
 *
 * @return false
 */
public boolean isFullTrainingSupported( ) {
    return false;
}
/**
 * <p>
 * Returns false.
 * </p>
 *
 * @return false
 */
public boolean isIncrementalTrainingSupported( ) {
    return false;
}
/**
 * <p>
 * Returns false.
 * </p>
 *
 * @return false
 */
public boolean isReadyToOperate( ) {
    return false;
}
/**
 * <p>
 * Does nothing.
 * </p>
 *
 * @param situations
 *              the list of situations to be used for training.
 */
public void performFullTraining(List<SimpleSituation> situations) {
}
/**
 * <p>
 * Does nothing.
 * </p>
 *
 * @param situations
 *              the list of situations to be used for training.
 * @param predictions
 *              the list of predictions (related to the situations) to be
used for training.
 */
public void performFullTraining(List<SimpleSituation> situations,
        List<SimplePrediction> predictions) {
}
```

```
/**
 * <p>
 * Does nothing.
 * </p>
 *
 * @param situation
 *              the Situation instance to be used for training.
 */
public void performIncrementalTraining(SimpleSituation situation) {
}
/**
 * <p>
 * Does nothing.
 * </p>
 *
 * @param prediction
 *              the <code>Prediction</code> instance (related to the
situation argument) to be
 *              used for training.
 * @param situation
 *              the <code>Situation</code> instance to be used for
                training.
 */
public void performIncrementalTraining(SimpleSituation situation,
SimplePrediction prediction) {
}
/**
 * <p>
 * Creates an instance of SimplePrediction.
 * <p>
 *
 * @param situation
 *              the <code>Situation</code> instance to be used for
making the prediction.
 * @return the result of prediction for the given situation. This is
an instance of the
 *              <code>Prediction</code>.
 */
public SimplePrediction predict(SimpleSituation situation) throws
PredictorException {
    SimplePrediction prediction = new SimplePrediction( );
    return prediction;
}
/**
 * <p>
 * Does nothing.
 * </p>
 *
 * @param value
 *              the value of the custom capability to be added.
 * @param key
 *              the key of custom capability to be added.
 */
public void putCapabilbity(String key, String value) {
}
/**
 * <p>
 * Does nothing.
 * </p>
 *
 * @param key
 *              the key of custom capability to be removed.
 */
public void removeCapability(String key) {
}
}
```

Use Example

This example uses the SimplePredictor class.

```
// Configure the predictor manager. Note, this is an optional step - the
// component could work without any configuration
PredictorManager.configure(createConfigurationObject( ));
// Next we can configure the predictor repository manager. Note, this is
```

```
// an optional step - the component could work without any configuration
PredictorDataRepositoryManager.configure(createDataConfigurationObject( ));
// We can initialize the predictor data in the repository. Of course,
// this is also optional
// Make the predictor data
SimplePredictorData predictorData = new SimplePredictorData( );
PredictorDataRepositoryManager.getPredictorDataRepository( ).putPredictorData(
        "com.topcoder.predictor.impl.SimplePredictor", predictorData);
// Set some information to predictor
predictorData.putAttribute("some predefined value #1", "val1");
predictorData.putAttribute("some predefined value #2", "val2");
// Our custom predictor will be found and instantiated by previous method
// We can also search the entire package to be retrieved for the concrete
// situations and predictions
Predictor<? extends Situation, ? extends Prediction> predictor1 =
PredictorManager
        .getPredictorBySignature("com.topcoder.predictor.SimpleSituation",
             "com.topcoder.predictor.SimplePrediction");
// Make the predictor by class name
PredictorA predictor2 = (PredictorA) PredictorManager
        .getPredictorByName("com.topcoder.predictor.impl.PredictorA");
// If several predictors were found, then the configured default one will
// be used (or in case of absent default predictor - just the latest
// found one).
// Now we can check the predictor capabilities and perform its training.
if (predictor2.isFullTrainingSupported( )) {
        // Perform full training.
        // Make the list of situations:
        List<SimpleSituation> situations = new ArrayList<SimpleSituation>( );
        // Make the situation 1
        SimpleSituation situation1 = new SimpleSituation( );
        situation1.putAttribute("some key 1", "some val 1");
        situation1.putAttribute("some key 2", "some val 2");
        // Make the situation 2
        SimpleSituation situation2 = new SimpleSituation( );
        situation2.putAttribute("some key 1", "another val 1");
        situation2.putAttribute("some key 2", "another val 2");
        situation2.putAttribute("some key 2", "another val 3");
        // Prepare the full training list
        situations.add(situation1);
        situations.add(situation2);
        // Train the predictor
        predictor2.performFullTraining(situations);
}
if (predictor2.isIncrementalTrainingSupported( )) {
        // We can perform the incremental training
        for (int i = 0; i < 100; i++) {
            // Retrieve the situation from somewhere
            SimpleSituation situation = new SimpleSituation( );
            // Perform training
            predictor2.performIncrementalTraining(situation);
        }
}
// Any situation, acceptable by our predictor, can be processed if the
// predictor is ready (like trained enough)
if (predictor2.isReadyToOperate( )) {
        SimpleSituation situation = new SimpleSituation( );
        // Calculate the prediction
        SimplePrediction prediction = predictor2.predict(new SimpleSituation( ));
        // Now we can process the output data from the prediction
        // Retrieve the root cause situation for the prediction
        String sName = predictor2.getSituationName( );
        // Retrieve the predictor, which was used for the prediction
        String pName = predictor2.getPredictionName( );
        // Get the prediction results (attributes)
        String result1 = prediction.getAttribute("some attr1");
        String result2 = prediction.getAttribute("some attr2");
        // The prediction can be cloned:
        SimplePrediction clonedPrediction = (SimplePrediction)
prediction.clone( );
        // And the results can be compared
        boolean areEqual = prediction.equals(clonedPrediction);
        // The result will be true
        // Let's clone the situation
        SimpleSituation clonedSituation = (SimpleSituation) situation.clone( );
        // The situations can be compared
        areEqual = situation.equals(clonedSituation);
        // The result will be true
        // Now, let's add some more data to the situation
```

```
clonedSituation.putAttribute("some input data new", "more data");
// And perform prediction again
prediction = predictor2.predict(clonedSituation);
}
```

Using Analysis Framework

To use the analysis features from this framework the user has to provide the concrete implementations of the SituationGenerator<S:Situation> and PredictionComparator<P:Prediction> interfaces. Those interfaces are simple marking interfaces, so only Iterable<S: Situation> features are needed for the concrete situation generator, and Comparator<P:Prediction> features are needed for the concrete prediction comparator (the most preferable predictions means the lesser value when comparing the predictions). Please refer to Java API for the needed methods.

Let's assume the user has provided the SimpleSituationGenerator<SimpleSituation> and SimplePredictionComparator<SimplePrediction>.

```
// First of all, we need to instantiate the main analysis class
SimpleAnalyzer<MyPredictor, SimpleSituation, SimplePrediction>
analyzer = new SimpleAnalyzer( );
PredictorManager.configure(createConfigurationObject( ));
// Next, let's retrieve the predictor
MyPredictor predictor = (MyPredictor)
PredictorManager.getPredictorByName("predictor");
// Set the predictor to the analyzer
analyzer.setPredictor(predictor);
// Make the situation generator instance
MySituationGenerator generator = new MySituationGenerator( );
// Next we may be need to configure the generator - it depends on its
// concrete implementation
// Make the prediction comparator instance
MyComparator comparator = new MyComparator( );
// Next we may be need to configure the comparator - it depends on its
// concrete implementation
// Perform simple analysis on the situation variations
List<SimplePrediction> predictions = analyzer.analyze(generator);
// The variations of situations are generated, the related predictions
// are calculated and returned in the line above.
// Please note, the prediction has a reference to the situation, so the
// generated situations can be also retrieved.
// Perform analysis for searching the best prediction
SimplePrediction bestPrediction = analyzer.analyze(generator,
comparator);
// The variations of situations are generated, the related predictions
// are calculated and the best one is returned in the line above. The
// comparator instance is used to find the most preferable prediction
```

What is claimed is:

1. A computer implemented method for estimating a likelihood of developing and submitting an asset by contestants in a competition, the computer implemented method comprising:

specifying minimum standards for the asset;

receiving, from a number of the contestants, indicia of interest in participating in the competition, wherein the indicia of interest comprises at least a registration of each of the contestants to the competition;

receiving ratings for each of the contestants from previous submissions for the asset;

calculating, by a hardware processor, an average rating from the received ratings;

calculating, by the hardware processor, a competition factor as a square root of an addition between a summed squared volatility of the ratings for each of the contestants and a variance of the ratings of the contestants from the average rating;

estimating, by the hardware processor, a win probability from an error function used in integrating a normal distribution function;

calculating, by the hardware processor, an expected rank for each of the contestants using the win probability;

calculating, by the hardware processor, an expected performance for each of the contestants using the expected rank for each of the contestants and an inverse of the normal distribution function;

calculating, by the hardware processor, an actual performance for each of the contestants using an actual rank for each of the contestants and the inverse of the normal distribution function;

calculating, by the hardware processor, a performed as rating for each of the contestants by adding an old rating from the previous submissions to a mathematical product between the competition factor and a difference between the actual performance and the expected performance;

calculating, by the hardware processor, a weight of the competition for each of the contestants from a number of times each of the contestants have been rated before, and adjusting said weight of the competition for each of the contestants by a first percentage when the ratings for each of the contestants fall within a first interval and by a second percentage when the ratings for each of the contestants exceed the first interval;

calculating, by the hardware processor, a new updated rating for each of the contestants by multiplying the weight of the competition for each of the contestants and the performed as rating;

estimating, by the hardware processor, a likelihood of at least one of the contestants developing and submitting the asset that meets the minimum standards, based on the number of the contestants from whom the indicia of interest were received and a determination of the new updated rating for at least one of the contestants being higher than a predetermined percentile;

specifying, by the hardware processor, a completion threshold representing a minimum acceptable estimated likelihood that the competition will successfully complete; and, upon determining that the estimated likelihood does not meet the completion threshold, taking one or more steps to increase the estimated likelihood.

2. The computer implemented method of claim 1 wherein the one or more steps to increase the estimated likelihood comprises an increase in prize amounts.

3. The computer implemented method of claim 1 wherein the one or more steps to increase the estimated likelihood comprises a modification of an end date of the competition.

4. The computer implemented method of claim 1 further comprising, upon determining that the estimated likelihood meets the completion threshold, closing the registration.

5. The computer implemented method of claim 1 wherein the asset is at least one of: a software program, a graphic design, an architecture design, a component design, a static prototype or a working prototype.

6. A system estimating a likelihood of developing and submitting an asset by contestants in a competition, the system comprising one or more hardware processors programmed to:

specify minimum standards for the asset;

receive, from a number of the contestants, indicia of interest in participating in the competition, wherein the indicia of interest comprises at least a registration of each of the contestants to the competition;

receive ratings for each of the contestants from previous submissions for the asset;

calculate an average rating from the received ratings;

calculate a competition factor as a square root of an addition between a summed squared volatility of the ratings for each of the contestants and a variance of the ratings of the contestants from the average rating;

estimate a win probability from an error function used in integrating a normal distribution function;

calculate an expected rank for each of the contestants using the win probability;

calculate an expected performance for each of the contestants using the expected rank for each of the contestants and an inverse of the normal distribution function;

calculate an actual performance for each of the contestants using an actual rank for each of the contestants and the inverse of the normal distribution function;

calculate a performed as rating for each of the contestants by adding an old rating from the previous submissions to a mathematical product between the competition factor and a difference between the actual performance and the expected performance;

calculate a weight of the competition for each of the contestants from a number of times each of the contestants have been rated before, and adjusting said weight of the competition for each of the contestants by a first percentage when the ratings for each of the contestants fall within a first interval and by a second percentage when the ratings for each of the contestants exceed the first interval;

calculate a new updated rating for each of the contestants by multiplying the weight of the competition for each of the contestants and the performed as rating;

estimate a likelihood of at least one of the contestants developing and submitting the asset that meets the minimum standards, based on the number of the contestants from whom the indicia of interest were received and a determination of the new updated rating for at least one of the contestants being higher than a predetermined percentile;

specify a completion threshold representing a minimum acceptable estimated likelihood that the competition will successfully complete; and, upon determining that the estimated likelihood does not meet the completion threshold, take one or more steps to increase the estimated likelihood.

7. The system of claim 6 wherein the one or more hardware processors are further programmed to increase the estimated likelihood by increasing prize amounts.

8. The system of claim 6 wherein the one or more hardware processors are further programmed to increase the estimated likelihood by modifying an end date of the competition.

9. The system of claim 6 wherein the one or more hardware processors are further programmed to close the registration upon determining that the estimated likelihood meets the completion threshold.

10. The system of claim 6 wherein the asset is at least one of: a software program, a graphic design, an architecture design, a component design, a static prototype or a working prototype.

11. A non-transitory computer readable storage medium for estimating a likelihood of developing and submitting an asset by contestants in a competition, on which is recorded computer executable instructions that, when executed by one or more hardware processors, cause the one or more hardware processors to:

specify minimum standards for the asset;

receive, from a number of the contestants, indicia of interest in participating in the competition, wherein the indicia of interest comprises at least a registration of each of the contestants to the competition;

receive ratings for each of the contestants from previous submissions for the asset;

calculate an average rating from the received ratings;

calculate a competition factor as a square root of an addition between a summed squared volatility of the ratings for each of the contestants and a variance of the ratings of the contestants from the average rating;

estimate a win probability from an error function used in integrating a normal distribution function;

calculate an expected rank for each of the contestants using the win probability;

calculate an expected performance for each of the contestants using the expected rank for each of the contestants and an inverse of the normal distribution function;

calculate an actual performance for each of the contestants using an actual rank for each of the contestants and the inverse of the normal distribution function;

calculate a performed as rating for each of the contestants by adding an old rating from the previous submissions to a mathematical product between the competition factor and a difference between the actual performance and the expected performance;

calculate a weight of the competition for each of the contestants from a number of times each of the contestants have been rated before, and adjusting said weight of the competition for each of the contestants by a first percentage when the ratings for each of the contestants fall within a first interval and by a second percentage when the ratings for each of the contestants exceed the first interval;

calculate a new updated rating for each of the contestants by multiplying the weight of the competition for each of the contestants and the performed as rating;

estimate a likelihood of at least one of the contestants developing and submitting the asset that meets the minimum standards, based on the number of the contestants from whom the indicia of interest were received and a determination of the new updated rating for at least one of the contestants being higher than a predetermined percentile;

specify a completion threshold representing a minimum acceptable estimated likelihood that the competition will successfully complete; and, upon determining that the estimated likelihood does not meet the completion threshold, take one or more steps to increase the estimated likelihood.

12. The non-transitory computer readable storage medium of claim 11, wherein the one or more hardware processors are caused to further increase the estimated likelihood by increasing prize amounts.

13. The non-transitory computer readable storage medium of claim 11, wherein the one or more hardware processors are caused to further increase the estimated likelihood by modifying an end date of the competition.

14. The non-transitory computer readable storage medium of claim 11, wherein the one or more hardware processors are caused to further close the registration upon determining that the estimated likelihood meets the completion threshold.

15. The non-transitory computer readable storage medium of claim 11, wherein the asset is at least one of: a software program, a graphic design, an architecture design, a component design, a static prototype or a working prototype.

* * * * *